(12) United States Patent
Clark

(10) Patent No.: US 6,343,280 B2
(45) Date of Patent: *Jan. 29, 2002

(54) DISTRIBUTED EXECUTION SOFTWARE LICENSE SERVER

(76) Inventor: Jonathan Clark, 4201 Monterrey Oaks Blvd. #1207, Austin, TX (US) 78749

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,373

(22) Filed: Dec. 15, 1998

(51) Int. Cl.⁷ ................................................ H04L 9/00
(52) U.S. Cl. ........................................ 705/55; 705/51
(58) Field of Search ................................ 705/1, 50–59; 380/201, 202

(56) References Cited

U.S. PATENT DOCUMENTS

| | | | | |
|---|---|---|---|---|
| 4,465,901 A | | 8/1984 | Best | 713/190 |
| 4,888,798 A | | 12/1989 | Earnest | 705/54 |
| 4,924,378 A | * | 5/1990 | Hershey et al. | 364/200 |
| 5,222,133 A | | 6/1993 | Chou et al. | 705/55 |
| 5,530,752 A | | 6/1996 | Rubin | 705/59 |
| 5,541,991 A | | 7/1996 | Benson et al. | 713/202 |
| 5,606,609 A | * | 2/1997 | Houser et al. | 380/4 |
| 5,652,793 A | | 7/1997 | Priem et al. | 705/56 |
| 5,657,388 A | * | 8/1997 | Weiss | 380/23 |
| 5,657,473 A | | 8/1997 | Killean et al. | 711/163 |
| 5,745,879 A | * | 4/1998 | Wyman | 705/1 |
| 5,751,805 A | | 5/1998 | Otsuki et al. | 705/54 |
| 5,754,646 A | | 5/1998 | Williams et al. | 705/55 |
| 5,757,914 A | * | 5/1998 | McMainis | 380/23 |
| 5,758,069 A | * | 5/1998 | Olsen | 395/187.01 |
| 5,790,664 A | * | 8/1998 | Coley et al. | 380/4 |
| 5,905,860 A | * | 5/1999 | Olsen et al. | 395/187.01 |
| 5,923,882 A | * | 7/1999 | Ho et al. | 395/709 |
| 6,009,543 A | * | 12/1999 | Shavit | 714/200 |
| 6,018,712 A | * | 1/2000 | Pactong | 705/1 |

FOREIGN PATENT DOCUMENTS

WO     WO 9013865 A  *  11/1990

OTHER PUBLICATIONS

Definition of "executable file" at http://www.webopedia.com, Jul. 3, 2001.*

* cited by examiner

*Primary Examiner*—Eric W. Stamber
*Assistant Examiner*—Donald L. Champagne
(74) *Attorney, Agent, or Firm*—Larry Mason Lee

(57) ABSTRACT

A method of protecting an executable image from unlicensed use is provided by remote execution of sequences of microprocessor instructions. Means of selecting sequences of instructions that execute infrequently and provide a high level of security against reverse engineering is provided. Selection means includes run-time profiling of an executable running under normal conditions. The selected sequences of instructions are replaced with instructions that interrupt the normal flow of execution and transfer control to a license server. A client computer executes the modified executable until the replaced sequences interrupt the normal flow of execution and transfer control to a license server. The license server executes the instructions which were replaced in the modified executable upon proper authorization by emulating the client microprocessor.

16 Claims, 18 Drawing Sheets

```
TEST    EAX, EAX
JNZ     SHORT LOC 10098813
MOV     ECX, 5
MOV     ESI, 10016A8H
LEA     EDI, [EBP + 0B4H]
REP     MOVSD
MOVSW
MOVSB
LEA     EDI, [ESP + 0B4H]
OR      ECX, 0FFFFFFFFh
XOR     EAX, EAX
LEA     EBX, [ESP + 0B4H]
REPNE   SCASB
NOT     ECX
CMP     ECX, 3CH
JBE     SHORT LOC_10098D4
LEA     EDI, [ESP + 0B4H]
OR      ECX, 0FFFFFFFFH
REPNE   SCASB
NOT     ECX
DEC     ECX
PUSH    3
MOV     EBX, ECX
LEA     ECX, [ESP + 0B8H]
SUB     ECX, 3BH
PUSH    10016a4H
ADD     EBX, ECX
PUSH    EBX
CALL    SUB_100B220
```

DISTRIBUTED EXECUTION SOFTWARE LICENSE SERVER

BACKGROUND OF THE INVENTION

1. Field of the Invention

The instant invention relates to the field of methods of protecting software from unlicensed use. More particularly, the instant invention relates to methods of protecting software from unlicensed use which utilize authentication of digital keys and distributed execution of executable software.

2. Prior Art

It is known in the prior art of protecting software from copying to utilize a system for providing secure access and execution of application software stored on a first computer by a second computer using a communication device while a communication link is maintained between the first and second computers. More specifically, it is known in the prior art to utilize a secure software rental system. The secure server rental system enables a user in a remote location using a personal computer and a modem to connect to a central rental facility, transfer application software from the central rental facility to the remote computer, and execute the application software on the remote computer while electronically connected to the central rental facility. When the communication link between the central rental facility and the remote computer is interrupted or terminated, the application software no longer executes on the remote computer. This interruption or termination is accomplished by integrating header software with the application software. The application software stored on the central rental facility is integrated with the header software to provide the security feature. The use of header software allows the user to execute the application software only while the user is electronically connected to the central rental facility continuously. This use of the header software is intended to prevent the user from copying the application software to a storage device on the remote computer, and subsequently executing the application software after interrupting or terminating the communications link between the central rental facility and the remote computer.

The methodology of utilizing a system for providing secure access and execution of application software stored on a first computer by a second computer using a communication device while a communication link is maintained between the first and second computers fails as a protection against copying because the system downloads the complete executable to the user's machine (with the inclusion of "header software") making it susceptible to simple cracking techniques which can avoid the protection system by removing the header software. Other forms of header software, such as those that require serial numbers before running the application software, have been shown to be ineffective in protecting software from copying and automated methods of removing the header software have been developed.

It is further known in the prior art of protecting software from copying to repetitively transmit portions or sequences of a retailed (distributed or delivered to an end user) computer program through one way media to a computing device, such that the computing device sequentially executes the transmitted portions or sequences of the retailed computer program, such that a user of the computing device has full use of the retailed computer program, and such that the computing device at no single time has a true, accurate and complete copy of the retailed computer program within the computing device, thereby preventing unauthorized duplication of the retailed computer program by eliminating the presence within the computing device, at any single time, of a true, accurate and complete copy of the retailed computer program.

The method of repetitively transmitting portions or sequences of a retailed computer program through one way media to a computing device, such that the computing device sequentially executes the transmitted portions or sequences of the retailed computer program, such that a user of the computing device has full use of the retailed computer program, and such that the computing device at no single time has a true, accurate and complete copy of the retailed computer program within the computing device fails as a protection against copying because the method allows a complete copy to be assembled from the transmitted pieces of the retailed computer program. No method that operates on a one way medium can be fully secured against unlicensed copying, because simply recording and replaying the transmitted data results in a working copy of the retailed computer program.

It is further known in the art of protecting software from copying to create an encoding technique to protect software programs and hardware designs from being copied, tampered with, and their functions from being exposed. The software programs and hardware designs (collectively called programs) thus encoded still remain executable. The encoding technique employs the concept of complexity of programs and produces proximity inversion in terms of functions contained in the programs, while preserving the behaviors. Various embodiments are possible to achieve this encoding which includes, for example, cascading and intertwining of blocks of the programs. This method of encoding software, while making tampering with the software much more difficult, does not prevent the software from being copied. This technique of encoding software might be combined with other methods of copy protection to make tampering more difficult. But, because this method allows the user complete access to the software, the software can be disassembled, studied, and modified. Given a determined user, software protected from tampering by this method can be reverse engineered because all of the software, in unencrypted form, resides physically on the user's machine.

Other and further copy protection methods are known in the art. For example, it is known to mark a sector on the disk containing the software to be protected as "bad" and store valid data in it. At one time most disk copy software would not copy bad tracks or sectors from a disk. However, such disk copy software is now common.

It is further known in the art of protecting software from copying to copy protect a software being delivered to the customer on a disk (or other physical storage media) by physically manufacturing a defective sector on the disk (or other physical storage media) containing the software to be protected and then to check for this defective sector when the software is loaded into the customer's volatile memory for operation. This software protection mechanism is readily defeated by reverse engineering the software to no longer check for bad sectors (method of modifying is discussed later). Furthermore, this technique of software copy protection requires special manufacturing capabilities, depends on the error detection capability of the software user's drive which may not be consistent across all users, and has the additional drawback that it doesn't allow the software purchaser, the authorized user, to backup his software.

It is further known in the art of protecting software from copying to utilize password based systems to protect software from copying. Typically, in such a system, the user is asked to enter a phrase from the user manual or from a sticker placed on the product's packaging when the software starts. The user manual, itself, was sometimes protected from copying by use of photocopy resistant paper. This method of copy protection for software is easily defeated by manually typing the required information and making it publicly available, or by reverse engineering the software to bypass the password check.

It is further known in the art of protecting software from copying to attach a hardware device (sometimes referred to as a "dongle" or "smart card") to a communication port as a protection against software copying. The software checks for the dongle sporadically during the software's execution and shuts down if the dongle is missing. This software copy protection mechanism is defeated by finding the code sequence within the software that checks for the dongle and removing that sequence of code. Additionally, this method requires the Software Vendor 3 to distribute expensive hardware with each copy of his software product limiting it's use to expensive software packages.

It is further known in the art of protecting software from copying to utilize a dongle protection method that stores part (a few bytes) of the software program's data inside the dongle's memory. In this manner, the software cannot function completely without the missing data. However the data or few bytes of executable code, are static (they never change) and once the data or bytes of executable code are read into memory from the dongle, the software copy protection can be defeated by replacing the data or bytes of executable code intended to be provided by the dongle with the data or lines of code as read from the active (RAM) memory.

It is further known in the art of protecting software from copying to encrypt portions of or entire software programs and decrypt them at the point they are run by using a user supplied key. A key may be in the form of a serial number, a card, or a dongle. This method fails to protect the software in question because the decrypted instructions are stored in the memory of the user's computer where they can easily be read and copied. Also, because the software program protected by the method in question uses locally executing software to verify a key, the locally available software can be modified such that any key appears to be the correct key. Further, if the key is in the form of a serial number, the serial number can be copied without limit. Finally, if the key is in the form of a hardware device, additional costs are incurred by the Software Vendor 3 for each copy of software sold.

It is further known in the art of protecting software from copying to produce software that stores specific information about the software's user, such as the user's software version number, the user's CPU identification number, BIOS version, the user's hard drive size and partition information, or the user's Ethernet card address, during the software unlocking process so that when the software next loads up to RAM it will check for that value. The unlocking process usually occurs by telephone or by network, where the user receives a secret key that decrypts the executable and also has the user's information encoded into the key. This method also suffers from the fact that the executable is resident on the user's machine and can be reverse engineered to no longer make checks for the above mentioned secret key or data. Additionally, this method of software copy protection is very inconvenient as the authorized user, software licensee, cannot run the copy protected software on another, perhaps upgraded, CPU nor can the user install a new hard-drive and still have the software function.

It is also known, in the art of protecting software from copying and license management, to store a file on the user's computer which represents a software license. When a user tries to execute protected software, the software checks to ensure that the license file is available locally. If the license file is not available locally, a search is performed for a license file that is not in use on another computer and if a license file is found, it is transferred from one computer to another. This method allows a group of users to share a license as long as the number of simultaneous users doesn't exceed the number of licenses. This method suffers from the same weaknesses described in the preciously mentioned prior art, which is that the software is available locally in a complete form and can be reverse engineered such that the software no longer checks for the license file when starting up. The License Server provides no needed service to the running software so removing the interaction with the License Server is a straight forward task.

Finally, it is known in the art of protecting software from copying to design a specialized microprocessor that decrypts programs on chip as they run. This method gives each decrypting microprocessor it's own decryption key stored locally within a tamper resistant casing. Because each processor has it's own decryption key, only software specifically encrypted using that key will operate correctly on that microprocessor. The microprocessor further encrypts and decrypts memory as it is written to and from an external bus. This invention offers much higher security than the above mentioned prior art, but has the disadvantage that the microprocessor can only run one application provided by one Software Vendor 3 because the decryption key uses a symmetrical block cipher. Because a new decrypting microprocessor is needed for each new software product, such microprocessors are unlikely to reach a mass market. This problem could be overcome by using public key encryption, however, the speed lost by encryption/decryption of every instruction and memory access prevents this microprocessor from running as fast as more general purpose microprocessors on the market. Further, the need for high security results in chip prices for the decrypting microprocessor to be much higher than the prices for currently available general purpose microprocessors on the market and requires additional batteries and tamper detecting circuitry. Furthermore, recent advances in cryptoanalysis such as differential power analysis could be used to recover the key from the device by measuring current draws and or electromagnetic emissions. Once the key has been recovered, the software can be decrypted and copied.

Various additional schemes for protection of software from copying are known in the prior art, however all appear to be variations on the above described methods.

All of the methods known in the prior art save and except the method utilizing a specialized microprocessor that decrypts programs on chip as they run, share a characteristic, they each permit all of the software that is to be protected into the possession and control of the user. Thus, almost every one of the methods known in the prior art shares the problem that if the user has complete access to the executable software and its copy protection system the user can figure out how the system works and use this information to defeat the software's copy protection system, certainly to disable the software's copy protection scheme.

SUMMARY OF THE INVENTION

The instant invention is of a method of protecting from unauthorized, unlicensed use. The method requires modification of the executable code of the software to be protected such that certain portions of the executable code operate on a License Server while the software to be protected operates on the authorized user's computer. A License Server may be any computing device that can secured against access by the Software User and which can communicate across potentially unsecured channels to the Software User's computing device. The preferred embodiment is described in terms of potentially long range communication channels such as found in the internet and telecommunication networks, however the License Server can be, as indicated in the description of alternate embodiments, located within the Software User's computing system, as long as it can be secured against observation and tampering by the Software User. Careful selection of the portions of the executable code to be run on the License Server connected by said data communications channel assure that no noticeable degradation of software performance is detected by the Software User.

Accordingly, it is an object of this invention to provide a method of protecting software operating on a computer which may be put in communication with a License Server from unauthorized, unlicensed use.

It is a further object of this invention to provide a method of protecting software operating on a computer which is connected to a network from unauthorized, unlicensed use which requires some selected portion of the executable code of the protected software to be run on a License Server connected to that same network.

It is a yet further object of this invention to provide a method of selecting the portions of the executable code of the protected software to be run on a License Server that does not degrade the performance of the protected software while making it computationally not feasible to recover the selected portions of the executable code.

Yet other and further objects of this invention will become apparent upon a reading of the following detailed description of the preferred embodiment.

BRIEF DESCRIPTION OF THE DRAWINGS

A better understanding of the present invention can be obtained from the detailed description of exemplary embodiments set forth below, to be considered in conjunction with the attached drawings, in which:

FIG. 4 depicts a block diagrammatic overview of a typical instruction sequence encountered/utilized during the practice of method of the instant invention.

Reference Number Index

Figure 1:
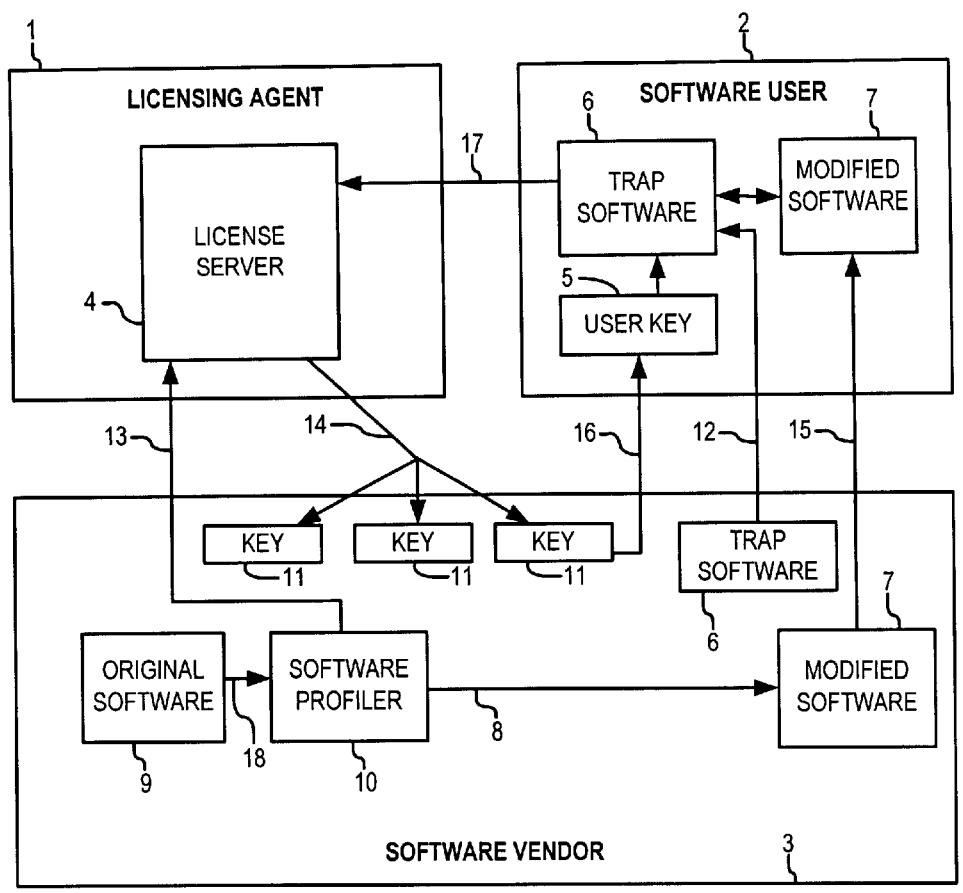
FIG. 1 depicts a block diagrammatic overview of the communication between the License Server, the Software User, and the Software Vendor during practice of the method of the instant invention.

| No. | Description |
|-----|-------------|
| 1.  | Licensing Agent |
| 2.  | Software User |
| 3.  | Software Vendor |
| 4.  | License Server |

-continued

Reference Number Index

| No. | Description |
|---|---|
| 5. | User Key |
| 6. | Trap Software |
| 7. | Modified Software. |
| 8. | Communication of Modified Software out of Software Profiler |
| 9. | Original Software |
| 10. | Software Profiler |
| 11. | Key |
| 12. | Communication of the Trap Software from the Software Vendor to the Software User |
| 13. | Communication between Software Profiler and License Server |
| 14. | Communication of keys from License Server to Software Vendor |
| 15. | Communication of Modified Software from Software Vendor to Software User |
| 16. | Communication of Key from Software Vendor to Software User |
| 17. | Communication between License Server and Trap Software Object |
| 18. | Communication of Original Software to Software Profiler |
| 19. | Communication between Software Object 24 and Software Object 39 |
| 20. | Communication from Software Object 39 to Software Object 25 |
| 21. | Communication from Software Object 27 to Software Object 72 |
| 22. | Communication between Software Object 45 and Software Object 28 |
| 23. | Software Object 23 (Initializes Trap Software) |
| 24. | Software Object 24 (Gets key from Software User) |
| 25. | Software Object 25 (Starts execution of Modified Software) |
| 26. | Software Object 26 (Waits for a TRAP/breakpoint in Modified Software execution) |
| 27. | Software Object 27 (Sends modified software's process CPU state to License Server) |
| 28. | Software Object 28 (Copies License Server's CPU state and memory changes in Modified Software processes' memory and continues execution of the Modified Software) |
| 29. | Software User action to initiate Trap Software |
| 30. | License Agent action to initiate operation of License Server |
| 31. | Software Object 31 (encompasses Software Objects 72, 74, and 45) |
| 32. | Communication between Software Object 291 (encompassed within Software Object 74) and Software Object 72 |
| 33. | Communication between Software Object 28 and Software Object 26 (encompassed within Software Object 43) |
| 34. | Communication between Software Object 23 and Software Object 24 |
| 35. | not used |
| 36. | Communication between Software Object 25 and Software Object 26 |
| 37. | Communication between Software Object 26 and Software Object 27 |
| 38. | not used |
| 39. | Software Object 39 (Verifies key) |
| 40. | Communication between Software Object 39 and Software Object 72 |
| 41. | not used |
| 42. | Communication between Software Object 72 and Software Object 74 |
| 43. | Software Object 43 (encompasses Software Objects 26 and 27) |
| 44. | Communication between Software Object 74 and Software Object 45 |
| 45. | Software Object 45 (sends results (CPU state and memory contents) of License Server execution back to the trap software) |
| 46. | Software Object 46 (stores missing code sequences in License Server) |
| 47. | Software Object 47 (generates keys (random numbers) in License Server) |
| 48. | Software Object 48 (associates keys in License Server with missing code sequences) |
| 49. | Software Object 49 (sends keys from License Server to Software Vendor) |
| 50. | Communication between Software Object 47 and Software Object 48 |
| 51. | Communication between Software Object 48 and Software Object 49 |
| 52. | not used |
| 53. | Communication between Software Object 62 and Software Object 47 |
| 54. | Software Object 54 (part of Software Profiler, saves inputs and outputs for each instruction sequence executed) |
| 55. | Software Object 55 (part of Software Profiler, starts execution of Original Software) |
| 56. | Communication between Software Object 55 and Software Object 144 (encompassed within Software Object 119 (encompassed within Software Object 57)) |
| 57. | Software Object 57 (part of Software Profiler, examines Original Software's execution patterns) |
| 58. | not used |
| 59. | Software Object 59 (part of Software Profiler, determines which instruction sequences to remove from Original Software) |
| 60. | Communication between Software Object 59 and Software Object 61 |
| 61. | Software Object 61 (sends code sequences to License Server and removes them from Original Software; also outputs Modified Software) |
| 62. | Software Object 62 (generates request from Software Vendor to buy keys from License Agent) |
| 63. | not used |
| 64. | Software Object 64 (distributes keys from Software Vendor to Software Users, one key to each User) |
| 65. | Software Object 65 (encompasses Modified Software, encrypted removed instructions, and encrypted identification number in the second embodiment) |
| 66. | not used |
| 67. | Communication between Software Object 54 (encompassed within Software Object 57) and Software Object 59 |
| 68. | 71. not used |
| 72. | Software Object 72 (verifies that client (Software User) has a working key) |
| 73. | Not used |
| 74. | Software Object 74 (encompassed within Software Object 31; emulates in License Server the instructions missing from the Modified Software, which were removed from the Original Software) |
| 75. | not used |
| 76. | Communication between Software Object 39 and Software Object 84 |
| 77. | 83. not used |
| 84. | Software Object 84 (a part of Trap Software, obtains a User Key from the Software User) |
| 85. | Communication between Software Object 84 and Software Object 86 |
| 86. | Software Object 86 (determines which Modified Software is to be executed) |
| 87. | Communication between Software Object 86 and Software Object 88 |
| 88. | Software Object 88 (sends the User Key to the License Server) |
| 89. | 113. not used |
| 114. | Communication between Software Object 74 and Software Object 28 |
| 115. | 117. not used |
| 118. | not used |
| 119. | Software Object 119 (Determine length of instruction sequence starting at IP) |
| 120. | Software Object 120 (restores the instructions replaced by the breakpoint and returns to emulation mode) |
| 121. | Software Object 121 (permits the instruction sequence to execute natively in the Modified Software) |
| 122. | Software Object 122 (places breakpoint instructions in RAM at the end of the instruction sequence) |
| 123. | Software Object 123 (determines whether instruction sequence already been rejected) |
| 124. | Software Object 124 (determines whether instruction sequence can be rejected) |
| 125. | Software Object 125 (records instruction sequence input state) |

-continued

Reference Number Index

| No. | Description |
|---|---|
| 126. | Software Object 126 (emulates instruction sequence and records instruction sequence outputs) |
| 127. | Software Object 127 (changes instruction pointer (IP) to end of sequence just emulated and continues execution of the Original Software) |
| 128. | Software Object 128 (determines whether the execution of the Original Software has finished) |
| 129. | Communication between Software Object 54 and Software Object 55 |
| 130. | not used |
| 131. | Communication between Software Object 120 and Software Object 119 |
| 132. | Communication between Software Object 123 and Software Object 121 |
| 133. | Communication between Software Object 124 and Software Object 122 |
| 134. | not used |
| 135. | not used |
| 136. | Communication between Software Object 119 and Software Object 123 |
| 137. | Communication between Software Object 123 and Software Object 124 |
| 138. | Communication between Software Object 124 and Software Object 125 |
| 139. | Communication between Software Object 125 and Software Object 126 |
| 140. | Communication between Software Object 126 and Software Object 128 |
| 141. | Communication between Software Object 127 and Software Object 119 |
| 142. | Communication between Software Object 128 and Software Object 127 |
| 143. | Communication between Software Object 128 and Software Object 54 |
| 144. | Software Object 144 (sets IP_Current to current instruction pointer, IP_Start to current instruction pointer, and IP_Max to IP_Start + 256) |
| 145. | Communication between Software Object 144 and Software Object 146 |
| 146. | Software Object 146 (determines instruction at IP_Current) |
| 147. | Communication between Software Object 146 and Software Object 148 |
| 148. | Software Object 148 (determines whether instruction is a Call) |
| 149. | Communication between Software Object 148 and Software Object 152 |
| 150. | Communication between Software Object 148 and Software Object 151 |
| 151. | Software Object 151 (sets IP_Current to IP_Current + length of current instruction) |
| 152. | Software Object 152 (determines whether the destination address of Call resides in a rejected sequence) |
| 153. | not used |
| 154. | Communication between Software Object 151 and Software Object 157 |
| 155. | not used |
| 156. | Communication between Software Object 157 and Software Object 146 |
| 157. | Software Object 157 (determines whether IP_Current>IP_Max) |
| 158. | Communication between Software Object 157 and Software Object 160 |
| 159. | Communication between Software Object 152 and Software Object 160. |
| 160. | Software Object 160 (sets instruction pointer for end of sequence to IP_current-IP_start) |
| 161. | Software Object 161 (determines whether sequence has executed more than 10 times and consumed more than 0.01% of processing time over the past 100,000 instructions) |
| 162. | Communication between Software Object 161 and Software Object 163 |
| 163. | Software Object 163 (determines whether the instruction sequence moved more than 2K of RAM from one location to another) |
| 164. | Communication between Software Object 163 and Software Object 167 |

-continued

Reference Number Index

| No. | Description |
|---|---|
| 165. | not used |
| 166. | not used |
| 167. | Software Object 167 (determines whether instruction sequence resides in publicly available code (such as libc)) |
| 168. | Communication between Software Object 167 and Software Object 169 |
| 169. | Software Object 169 (communicates the determination that the sequence is not rejected yet) |
| 170. | Communication between Software Object 161 and Software Object 280 |
| 171. | Communication between Software Object 163 and Software Object 280 |
| 172. | Software Object 172 (produces a reject sequence signal) |
| 173. | Communication between Software Object 167 and Software Object 280 |
| 174–195. | not used |
| 196. | Software Object 196 (sorts non-rejected instruction sequences by fitness values) |
| 197. | Communication between Software Object 196 and Software Object 198 |
| 198. | Software Object 198 (selects the best N instruction sequences) |
| 199. | Communication between Software Object 198 and Software Object 200 |
| 200. | Software Object 200 (replaces instructions in executable image with Traps/Break Points) |
| 201. | Communication between Software Object 200 and Software Object 202 |
| 202. | Software Object 202 (sends replaced instructions to License Server) |
| 203. | Communication between Software Object 202 and Software Object 204 |
| 204. | Software Object 204 (receives digital "keys" from the license server) |
| 205. | not used |
| 206. | Software Object 206 (renames executable.exe to executable.bin and copies trap-handling software to executable.exe) |
| 207. | Software Object 207 (reads instruction pointer (IP) and CPU registers from client) |
| 208. | Communication between Software Object 207 and Software Object 209 |
| 209. | Software Object 209 (uses network address supplied by client to determine which set of removed instructions to use) |
| 210. | Communication between Software Object 209 and Software Object 211 |
| 211. | Software Object 211 (begins emulation of client instructions at IP) |
| 212. | Communication between Software Object 211 and Software Object 215 |
| 213. | Software Object 213 (send request to Trap Software for referenced memory and adds memory to cache) |
| 214. | Software Object 214 (determines whether memory address referenced is in the cache sent by the client) |
| 215. | Software Object 215 (determines whether the instruction at IP references memory) |
| 216. | Communication between Software Object 215 and Software Object 219 |
| 217. | Communication between Software Object 215 and Software Object 214 |
| 218. | Communication between Software Object 214 and Software Object 213 |
| 219. | Software Object 219 (emulates the current instruction and advances the instruction pointer to the next instruction) |
| 220. | Communication between Software Object 222 and Software Object 215 |
| 221. | Communication between Software Object 219 and Software Object 222. |
| 222. | Software Object 222 (determines whether IP is still in current instruction sequence) |
| 223. | 226. not used |
| 227. | Software Object 227 (reads User Key) |
| 228. | Communication between Software Object 227 and Software Object 229 |
| 229. | Software Object 229 (determine if key is valid) |
| 230. | Communication between Software Object 229 and Software |

-continued

Reference Number Index

| No. | Description |
|---|---|
| | Object 231 |
| 231. | Software Object 231 (determines whether key has already reached it's maximum number of clients) |
| 232. | Communication between Software Object 231 and Software Object 233 |
| 233. | Software Object 233 (decrements the maximum number of clients for this key) |
| 234. | Communication between Software Object 233 and Software Object 235 |
| 235. | Software Object 235 (allows client to request execution of instruction instructions) |
| 236. | Communication between Software Object 229 and Software Object 238 |
| 237. | Communication between Software Object 231 and Software Object 239 |
| 238. | Software Object 238 (notifies client that the current executable has been tampered with or is not supported by server) |
| 239. | Software Object 239 (sends message to user stating key is in use and asking user to abort program or try another key) |
| 240. | Software Object 240 (checks for presence of key on disk) |
| 241. | Communication between Software Object 240 and Software Object 242 |
| 242. | Software Object 242 (determines whether key password protected) |
| 243. | Communication between Software Object 242 and Software Object 244 |
| 244. | Software Object 244 (prompts user for a password) |
| 245. | Communication between Software Object 244 and Software Object 246 |
| 246. | Software Object 246 (uses password to decrypt key) |
| 247 | Communication between Software Object 246 and Software Object 248 |
| 248. | Software Object 248 (communicates key to Software Object 86) |
| 249. | Communication between Software Object 240 and Software Object 250 |
| 250. | Software Object 250 (prompts user to provide key) |
| 251. | Communication between Software Object 250 and Software Object 252 |
| 252. | Software Object 252 (prompts user with option to password protect key) |
| 253. | Communication between Software Object 252 and Software Object 248 |
| 254. | Communication between Software Object 242 and Software Object 248 |
| 255. | 263. not used |
| 264. | Communication between Software Object 266 and Software Object 4 |
| 265. | Communication between Software Object 4 and Software Object 269 |
| 266. | Software Object 266 (sends a "ping" message to each server to determine which appears to have the fastest network path) |
| 267. | Software Object 267 (makes user connection to best server) |
| 268. | Communication between Software Object 267 and Software Object 25 |
| 269. | Software Object 269 (sporadically polls servers) |
| 270. | Software Object 270 (determines whether a faster route has been found) |
| 271. | Software Object 271 (ends session with slower server and connects to faster server) |
| 272. | Communication between Software Object 271 and Software Object 269 |
| 273. | Communication between Software Object 270 and Software Object 269 |
| 274. | Communication between Software Object 266 and Software Object 267 |
| 275. | not used |
| 276. | Communication between Software Object 25 and Software Object 269 |
| 277. | Communication between Software Object 269 and Software Object 270 |
| 278. | Communication between Software Object 270 and Software Object 271 |
| 279. | not used |

-continued

Reference Number Index

| No. | Description |
|---|---|
| 280. | not used |
| 281. | Software Object 281 (executes instruction sequence) |
| 282. | not used |
| 283. | Communication between Software Object 281 and Software Object 284 |
| 284. | Software Object 284 (determines whether execution results in more than 8K of networked memory read/writes) |
| 285. | Communication between Software Object 284 and Software Object 289 |
| 286. | Communication between Software Object 284 and Software Object 287 |
| 287. | Software Object 287 (determines whether instruction sequence has been executed more than 100 times in the last minute) |
| 288. | Communication between Software Object 287 and Software Object 289 |
| 289. | Software Object 289 (determines whether more than 50% of missing instructions have already been transmitted to clients) |
| 290. | Communication between Software Object 289 and Software Object 291 |
| 291. | Software Object 291 (sends removed instruction sequence to client and allows client to execute locally) |
| 292. | not used |
| 293. | Communication between Software Object 287 and Software Object 45 |
| 294. | Communication between Software Object 289 and Software Object 45 |
| 295. | Communication between Software Object 45 and Software Object 72 |
| 296. | Software Object 296 (encrypted removed instructions) |
| 297. | Software Object 297 (License Server's private encryption key) |
| 298. | A sample Instruction Sequence |
| 299. | encrypted identification number |
| 300. | Serial Number |
| 301. | License Information |
| 302. | not used |
| 303. | Software Object 302 (removes instructions from original software) |
| 304. | Communication between Software Object 303 and Software Object 305 |
| 305. | Software Object 305 (generates Random Identification number) |
| 306. | Communication between Software Object 306 and Software Object 307 |
| 307. | Software Object 307 (appends Identification number to Removed Instructions and encrypts result using License Server's public encryption key) |
| 308. | not used |
| 309 | Software Object 309 (generates Serial number) |
| 310. | Communication between Software Object 309 and Software Object 311 |
| 311. | Software Object 311 (concatenates Identification number with serial number and license information) |
| 312. | Communication between Software Object 311 and Software Object 313. |
| 313. | Software Object 313 (encrypts Key information using public encryption key) |
| 314. | Software Object 314 (communicates Modified Software to Software User) |
| 315. | Random Number (used to differentiate keys) |
| 316. | Key (second embodiment) |
| 317. | License Server's Public Encryption Key |
| 318. | 319. not used |
| 320. | Software Profiler of second embodiment |

DESCRIPTION OF THE PREFERRED EMBODIMENTS

Software authors have long struggled to make copyright laws automatically enforceable; that is, to protect their software from being copied or utilized without the Software User 2 possessing a proper license from the author. With the advancements in computers, storage devices, and communications (including in particular the advent of high speed data communications over the internet), movies, music, books, and computer software all become easily copied and transmitted around the world. Current methods of distributing data involve making a static representation of the data and storing and/or transmitting that static representation of the data via a one-way source such as disk, CDROM, television broadcast, or internet download. Static data cannot be protected against illegal duplication because of the nature of static data. For example, music must be played in a way that the human ear can hear it. The music sounds the same each time it is played, so recording the sound waves as they travel to the ear cannot be stopped.

Dynamic data sources produce different results each time the results are displayed. A simple example of a dynamic data source might be a weight scale. The scale produces different outputs depending on it's input, i.e. how much weight is placed on it. A user can copy some of the results from the scale but these copies do not capture the usefulness of the device.

Computer software is largely used in a static form. An executable image of the software is created by a compiler. The executable image is then transferred in its entirety to a user who loads the executable image into his computer memory and executes it. Because the user has full access to the software there is nothing to stop him from copying it and transferring it to others without limit.

Some recent inventions/innovations have attempted to prevent the user's full access to the software and these inventions/innovations are above-noted in the statement of prior art. The most successful of such currently known methods of protecting software from illegal duplication operates by attaching additional code (instructions) to the software program that checks for the presence of some special hardware (a dongle). If the hardware exists, then the software continues to execute, otherwise it shuts down. In this manner a physical medium is used to represent each licensed copy of the software. Some implementations of this method store special data (or instructions) on the hardware device that is needed by the software.

These recent inventions/innovations do not defeat the efforts of a very determined user to reverse engineer the software and illegally duplicate the software. The software can be modified to exclude checks to the hardware (dongle), and the communication channels between the software and the hardware can be monitored to collect any missing data. Most users will not have the patience to undertake the intensive task of studying and tampering with the software, but once a single user has completed the task the software can then be copied without limit. Furthermore, these hardware devices (dongles) cost additional money, making them unacceptable for use with low cost software packages. The dongles limit sales of the software to the sale of a physical item, and they add inconvenience that many software users have expressed anger about.

There is a serious need for a stronger software copy protection scheme than is currently available that has a low-implementation cost. A dramatic illustration of this fact is seen by examining the software piracy rates in many countries. According to the Software Publisher's Association (SPA): Vietnam 99%, China 96%, Russia 91%. In these countries it is very difficult to sell software because it is readily available in a pirated form for a fraction of the retail price. Efforts to prevent piracy in these countries have not been effective because previous automatic methods (discussed above in the prior art statement) of enforcement fail when pitted against a user determined to reverse engineer the software, and the cost of manual (physical) enforcement far outweighs the gains made in software sales. Further, with the growing popularity of public networks such as the internet, reverse engineered software (pirated copy) is freely exchanged and universally available for anyone who looks in the right places (for example on the internet). The means of enforcing licenses by reliance upon the currently available legal processes has become unfeasible.

Object level programming is well known and understood in the current art as are systems built upon a client-server architecture. The detailed description of the instant invention will be made and understood in terms of software objects operating within a client-server architecture which are not specific to any particular programming language as the instant invention may be implemented and used in any of a number of programming languages.

As seen in FIG. 1, the instant invention anticipates a three party system. The three parties are the Licensing Agent 1, the Software User 2, and the Software Vendor 3. The Licensing Agent 1 operates a License Server 4. The Software User 2 operates a computer wherein resides three software objects, the User Key 5, the Trap Software 6, and the Modified Software 7. The third party is the Software Vendor 3 whose computational system contains the four software objects, as follows: the Original Software 9, the Software Profiler 10 (whose operation is detailed in FIG. 6), multiple unsold Keys 11, and a Software Vendor's 3 copy of the Modified Software 7.

From FIG. 1, the method of the instant invention can be seen. The method begins with a Software Vendor 3 who is in possession of Original Software 9 that the Software Vendor 3 wishes to sell to a Software User 2. The Original Software 9 is in fully compiled, executable form. The Software Vendor 3 causes the Software Profiler 10 to operate on the Original Software 9. The Software Profiler 10 acts to remove certain selected executable instructions from the Original Software 9, creating the Software Vendor's 3 copy of the Modified Software 7. The Software Vendor 3 then transfers, or communicates 13, the removed executable instructions from the Original Software 9 to the License Server 4. The License Server 4 then creates a series of Keys 11 and communicates 14 the Keys 11 to the Software Vendor 3. The Software Vendor 3 then sells and communicates 15 (by any transfer means, including without limitation on disk, by internet download, on CD-ROM, or otherwise) the Modified Software 7 to the Software User 2. The Software Vendor 3 also communicates 16 (again, by any transfer means) to the Software User 2 the User Key 5 (User Key 5 is a single one of the Keys 11) and the Trap Software 6. All three objects, the Modified Software 7, the User Key 5 and the Trap Software 6 must be installed on the Software User's 2 computer for the method of the instant invention to work. After installation of the three objects on the Software User's 2 computer, communication 17 between the Software User 2 and the License Server 4 permits the License Server 4 to execute the removed executable instructions from the Original Software 9 and permits the Modified Software 7 to run/execute as expected by the Software User 2, provided that such communication 17 is over a link networking the License Server 4 and the Software User's 2 computer.

FIG. 1. provides an overview of the communication between the three parties involved in the instant invention; the Licensing Agent 1, the Software Vendor 3, and the Software User 2. The Licensing Agent 1 may own and/or operate a plurality of License Servers 4. The License Server's 4 responsibilities include, receiving instructions removed from Original Software 9, generating and communicating 14 Keys 11 for Original Software 9, and communicating 17 with Trap Software 6 to provide service to Software User 2. The Software Vendor 3 communicates Original Software 9 to Software Profiler 10. The Software Profiler 10 executes Original Software 9 and determines which instructions to remove. The instructions to be removed are communicated 13 to the License Server 4 by Software Profiler 10. After the instructions to be removed are communicated 13 to the License Server 4, the Software Profiler 10 creates the Modified Software 7 by removing the instructions from the Original Software 9 and saving the instructions remaining in the Original Software 9 to a permanent form. The License Server 4 communicates 14 Keys 11 which are associated with the Original Software 9 to the Software Vendor 3. These Keys 11 allow Software Users 2 to execute the instructions removed from the Original Software 9 through use of the Trap Software 6. The Software Vendor 3 transmits 16 a User Key 5, a copy of the Trap Software 6, and a copy of the Modified Software 7 to a Software User 2, presumably when the Software User 2 has purchased a license to execute the Software from the Software Vendor 3. The Software User 2 begins running the Trap Software 6 which obtains a User Key 5 from the Software User 2 and begins running the Modified Software 7. The Trap Software 6 communicates 17 the User Key 5 to the License Server 4, where the User Key 5 is accepted or rejected. If the License Server 4 accepts the User Key 5 then the License Server 4 permits the Trap Software's 6 request for the License Server's 4 execution of the instructions missing (removed by the Software Profiler 10) from the Modified Software 7.

Figure 2:
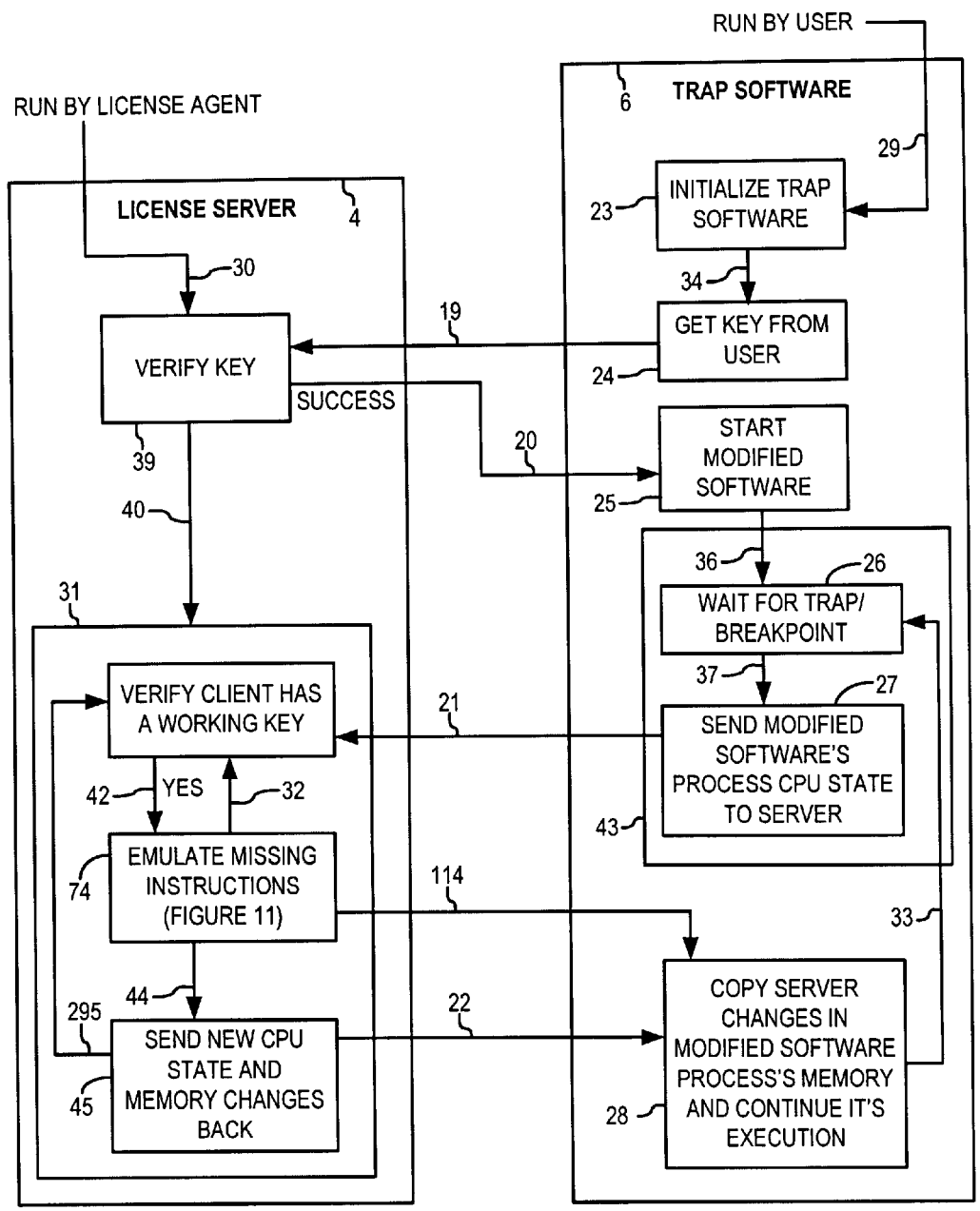
FIG. 2 depicts a block diagrammatic overview of the communication between the License Server and the Software User during practice of the method of the instant invention.

FIG. 2. Provides a block diagrammatic overview of the communication between the License Server 4 and the Trap Software 6 (located on the Software Users 2 computer) during practice of the method of the preferred embodiment of the instant invention. License Agent I begins executing License Server 4. Software User 2 begins executing Trap Software 6 which causes software object 23 to initialize the Trap Software 6. Software object 23 communicates 34 that it has been initialized to software object 24. Software object 24 obtains a User Key 5 from the Software User 2. Software object 24, upon receipt of a User Key 5 from Software User 2, communicates 19, over a network the User Key 5 to License Server's 4 software object 39. License Server's 4 software object 39 acts to verify or refute the User Key's 5 validity and communicates 20 the state of validity to the Trap Software's 6 software object 25. FIG. 2 does not show the operational result of the License Server's 4 receipt of a User Key 5 which is refuted (not verified) by software object 39, but it should be obvious that Software User 2 cannot operate the Modified Software 7 when the User's Key 5 has been refuted because the License Server 4 will not thereafter (after the User Key 5 is refuted) honor further requests from the Trap Software 6 being run by the Software User 2. Trap Software's 6 software object 25, upon receipt of communication 20 of a successful User Key 5 verification message from License Server's 4 software object 39, begins executing the Modified Software 7. Trap Software's 6 software object 25 communicates 36 that it has started executing the Modified Software 7 to software object 26. Software object 26 causes the Trap Software 6 to pause and monitor the status of the Modified Software 7 until a Trap/Breakpoint occurs. A Trap/Breakpoint is a special instruction that, when executed, causes a CPU to halt it's normal progress, save it's context and execute a special debugging routine. In this case breakpoint instructions were inserted into the Modified Software 7 in place of the removed instructions by the Software Profiler 10. The Trap Software's 6 software object 26, at some point in the execution of the Modified Software 7, encounters a Trap/Breakpoint instruction. Software object 26, upon determining that a Trap/Breakpoint has occurred, communicates 37 this fact to software object 27. Software object 27 communicates 21 the state of the CPU when the Modified Software 7 reached the Trap/Breakpoint to the License Server's 4 software object 72. Software object 72 acts to verify that there is a User Key 5 that has been verified associated with the network address used by the Software User 2. If the network address is verified, software object 72 communicates 42 such verification to software object 74. If the network address is not verified by software object 72, the request from the Trap Software 6 is ignored by the License Server 4. Software object 74 acts to emulate the missing (removed) instructions from the Original Software 9 and communicates 44 the results of the emulation to software object 45. Software object 45 communicates 22 the new state of the Modified Software 7 after the execution of the missing (removed) instructions from the Original Software 9 has completed across the network to the Trap Software's 6 software object 28. Trap Software's 6 software object 28 acts to insert the results of the execution of the instructions on the License Server 4 into the process of the Modified Software 7 by setting the CPU registers and memory on the Software User's 2 computer to the modified values that were obtained during execution on the License Server 4. Software object 28 causes the Modified Software 7 to continue execution by communicating 33 to software object 26 the fact that software object 28 has replaced the CPU registers and memory on the Software User's 2 computer. Software object 26 continues to execute the Modified Software 7, as described above, until another Trap/Breakpoint is encountered or the Modified Software 7 completes its execution.

Figure 3:
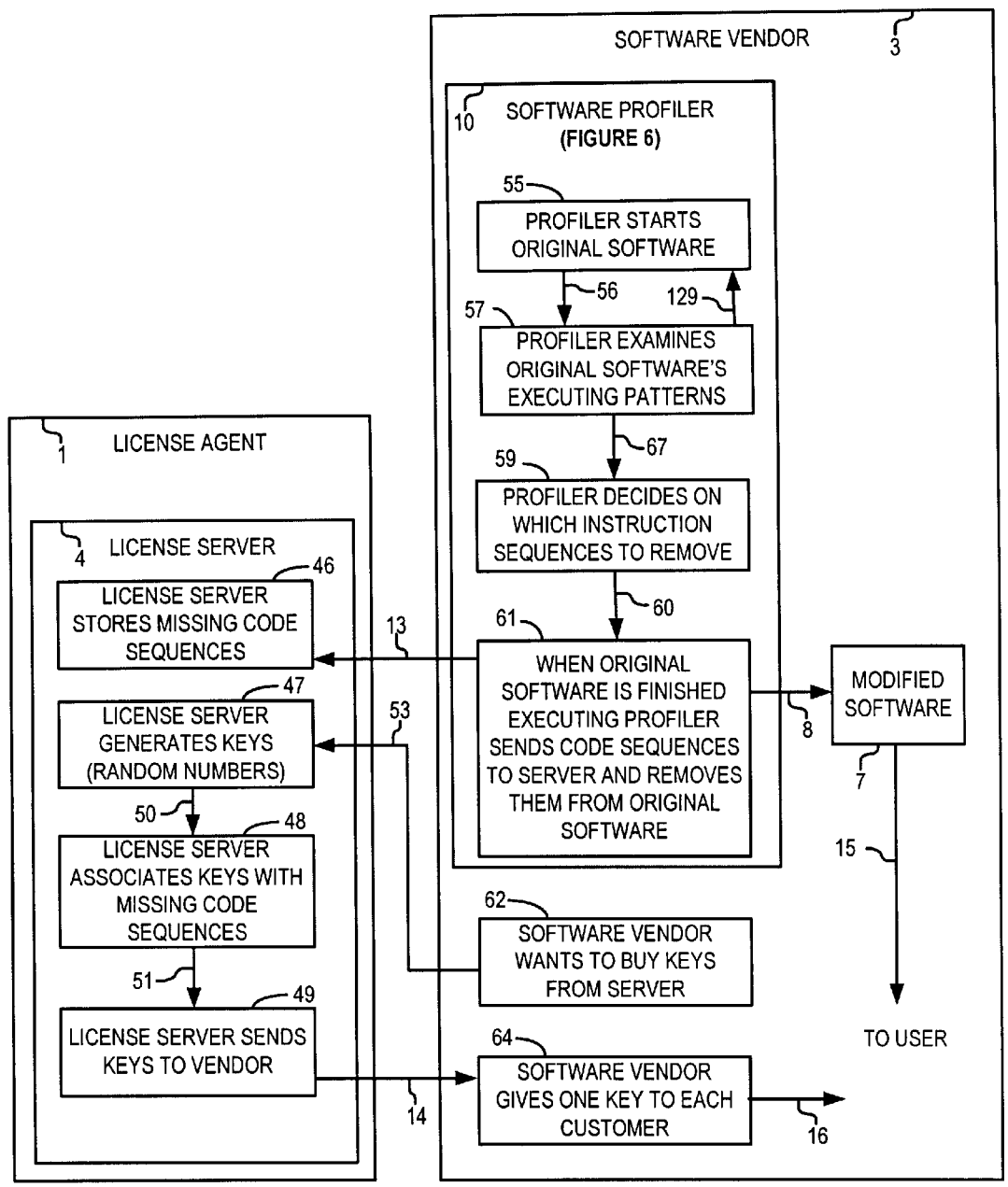
FIG. 3 depicts a block diagrammatic overview of the communication between the License Server and the Software Vendor during practice of the method of the instant invention.
Figure 17:
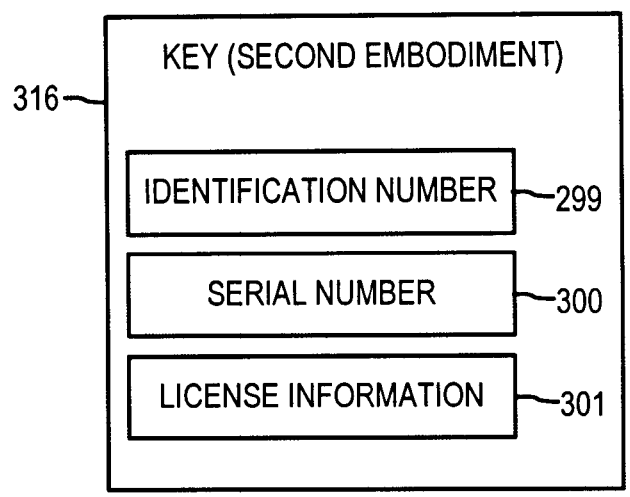
FIG. 17 depicts a block diagrammatic overview of a Key's components during practice of the method of the second embodiment of the instant invention.

FIG. 3 depicts a block diagrammatic overview of the communication between the License Server 4 and the Software Vendor 3 during practice of the method of the preferred embodiment of the instant invention. The Software Vendor 3 begins the process by executing the Software Profiler 10 and supplying the Original Software 9. Software Vendor's 3 software object 55 begins execution of the Original Software 9 in a routine fashion. Software object 55 communicates 56 the fact that the Original Software 9 has begun execution to software object 57. Software object 57 examines the execution patterns of the Original Software 9. Software object 57 communicates 67 selected code sequences which are candidates for removal to software object 59 together with the fact of the termination of the execution of the Original Software 9 when the Original Software 9 terminates execution. Software object 59 makes the determination of which instructions (code sequences) to remove from the Original Software 9 for execution on the License Server 4. When software object 59 has determined which instructions to remove from the Original Software 9, software object 59 communicates 60 these selected instructions to software object 61 which communicates 13 the selected instructions to the License Server's 4 software object 46 and removes the instructions from the Original Software 9 creating Modified Software 7. The Modified Software 7 is then (normally at time of Software User's 2 purchase of the software) communicated 15 to Software User 2. Software object 61 acts to communicate 13 the instructions removed from the Original Software 9 to the License Server's 4 software object 46 where the instructions are stored for further use. At any point after the instructions removed from the Original Software 9 have been communicated 13 to the License Server 4, the Software Vendor 3 may decide to purchase Keys 11 from the License Agent 1. The process of the Software Vendor 3 purchasing Keys 11 from the License Agent 1 begins in software object 62 which communicates 53 the desire to purchase Keys 11 from the Software Vendor 3 to the License Server's 4 software object 47. Software object 47 generates unique Keys 11 in a number responsive to the request of the Software Vendor 3. These generated Keys 11 are communicated 50 by software object 47 to software object 48 which acts to associate the Keys 11 with the removed instructions obtained from software object 61 and stored in software object 46. Software object 48 acts to communicate 51 the associated Keys 11 to software object 49 which transmits 14 the Keys 11 to the Software Vendor's 3 software object 64. Software object 64 acts to store the Keys 11 and allow the Software Vendor 3 to transmit 16 a single User Key 5 to each Software User 2 who purchases a license to execute Original Software 9. A second embodiment of the instant invention's method of operation is depicted in FIG. 17 in which Keys 11 can be generated by Software Vendor 3 without the need for communication with a License Server 4.

The instant invention implements a method for converting static computer programs (Original Software 9) into a dynamic medium that is highly resistant to reverse engineering and provides a static component (Modified Software 7) that executes locally at high speed. In essence the instant invention uses an electronic network (communication 17 between the License Server 4 and the Software Users 2 computer) to create a barrier between the Software User 2 and the Original Software 9. The Original Software 9 is modified (creating a Modified Software 7) in such fashion that portions of the executable image are placed on a remote License Server 4. When the Modified Software 7 needs to execute a missing portion of the executable image of the Original Software 9, the Modified Software 7 (in conjunction with the Trap Software 6) contacts the License Server 4 with a set of inputs, and the License Server 4 then executes the missing portion(s) of the Original Software 9 and returns the result of the execution to the Software User 2 for continued local execution of the Modified Software 7. License Server 4 access is granted to only to licensed Software Users 2. Though the Modified Software 7 may be copied freely it will not execute properly without an authorized license (User Key 5) authenticated by the License Server 4.

The method of the instant invention is low cost because the Software User 2 is presumed to already have the equipment needed to make a network connection and, thus communication 17 between the Software User 2 and the License Server 4. The method of the instant invention is also secure because although the Software User 2 can examine the input and output going across the network communication 17, the Software User 2 cannot determine the Modified Software's 7 missing functionality. The Software User 2, in order to defeat the copy protection of the instant invention, must determine the missing functionality of the Modified Software 7, which can only be determined by trial and error. As the number of inputs and outputs of a "function" being executed in the Modified Software 7 grows in size, a 100% correct interpretation of what the functionality is that is being supplied by the remote execution in the License Server 4 of the removed code sequences becomes impossible to guess.

Mathematically this can be shown as:

$$y=f(x)$$

This is the simplest function. Assuming x is a 32 bit number, in order to test that you have guessed the correct function f() you would need to send over 4 billion test bits to the License Server 4 to execute. Assuming that the network medium, communication 17, takes 5 milliseconds to complete each transaction, this would take 4.7 years. As the functions become more complex, the time required to make sure they are correct tends toward infinity. For example, by adding one more input into the function, $y=f(a,b)$ the time required to test becomes 20,529,229,070 years. In this invention, the inputs to f() (communicated 17 from the Software User 2 to the License Server 4) may include all of the Software User's 2 RAM memory and CPU registers, making it computationally unfeasible to test even a fraction of the input space. The Software Profiler 10 attempts to determine functions f() which are non-trivial and hence difficult to deduce. If f() always produces regardless of it's inputs, or has a limited number of actual inputs that are used, it would be possible to deduce f(). The problem of deducing f() is analogous to using cryptoanalysis to determine a secret password, but instead of deducing the key, the task of a person attempting to reverse engineer software protected by the method of the instant invention is to deduce the algorithm that produces the key. The instant invention uses a measure of the difference between the inputs and outputs resultant from two executions of the same program to determine which instructions or group of instructions (see example instruction sequence 298 in FIG. 4) execute in a difficult to predict fashion. This ensures the selection of an instruction sequence 298 that can not be eliminated by replay attack, which occurs when an individual who is attempting to reverse engineer the software protection provided by the instant invention (an attacker or pirate) captures and records the inputs and outputs of the execution of the instruction sequence 298 and replays them later attempting to circumvent the protection of the instant invention by providing the outputs of the execution of the instruction sequence 298 to the Modified Software 7 upon the occurrence of a request to the License Server 4 for execution of the instruction sequence 298.

A typical computer program executes in three stages, initialization, user interaction, and shutdown. The first stage, initialization, occurs when a program first begins executing and allows the program to prepare to handle user interaction. The initialization stage typically involves opening interaction windows, loading resource files, and initializing data structures the program will use in the interaction state. Because this stage generally executes without any user input and typically does the same thing every time the program runs, it is difficult to protect instruction sequences 298 executed here. It is assumed that a person desiring to reverse engineer the protection provided by the method of the instant invention has access to all of the program's memory and all communication with the License Server 4. If an instruction sequence 298 is executed exactly the same way each time it is run on the License Server 4, communication with the License Server 4 can be replayed at the next time the program is run, producing the effect of executing the instruction sequence 298. Further, any software protection methodology which depends on removing instruction sequences 298 from the initialization section could be bypassed by storing the entire state of the computer software in memory after it has loaded and then the loading it back into memory the next time the computer software is run. This is one of the reasons many of the prior art protection mechanisms fail to fully protect software, the initialization stage executes in a manner that is deterministic.

The next stage of a program's execution is the user interaction stage. This stage takes input from the user, applies some computation and displays or produces a result in accordance with the function of the software. In most modern software packages the user interaction occurs through the use of a graphical interface and the user inputs are considered to be mouse clicks, keyboard presses, menu selections, and other forms of program input/guidance. Many software packages may also take input from input files which input acts to control the software package's (program's) execution flow and processing. An example of this type of input might include a word processor that loads up a previously saved file. The program (word processor in this example) produces different results depending on the contents of the file it is loading. Instructions executed during this stage can be protected using the method of the instant invention because the results of the program's execution cannot simply be replayed if the program is protected by the method of the instant invention.

The final stage of a program's execution, shutdown, is where the program frees up the resources it has allocated in the previous stages and quits. Resources that might have been allocated include files, windows, and memory. This stage of execution is generally not important to a user because by the time it occurs, all the useful work has been accomplished. If this stage does not execute at all the user will have already have used the software package to the full extent that the user needed. In most modern operating systems, resources are automatically freed by the system when a program quits, so this stage can often be skipped without adverse effects. Removing instructions from this execution stage would produce no enhanced security for the program and if all removed instructions are selected from this execution stage, no security for the program is provided.

There are two methods of identifying which instructions belong to which stage of execution. The first method depends on the Software Vendor 3 to signal to the Software Profiler 10 when each stage begins and ends. This signaling process can be performed interactively by the Software Vendor 3 or signals can be embedded into the software application, such that it automatically signals to the Software Profiler 10 when the program has completed the initialization stage and again when it is beginning the shutdown stage. Because some initialization sections may be delayed until the first time they are needed, this method may be time consuming and prone to errors on the part of the Software Vendor 3. A second and referred method automatically studies the execution flow of two complete executions of the same program. The two executions can be later examined for differences. These differences disclose the exact set of instructions that can be protected by the instant invention.

Figure 7:
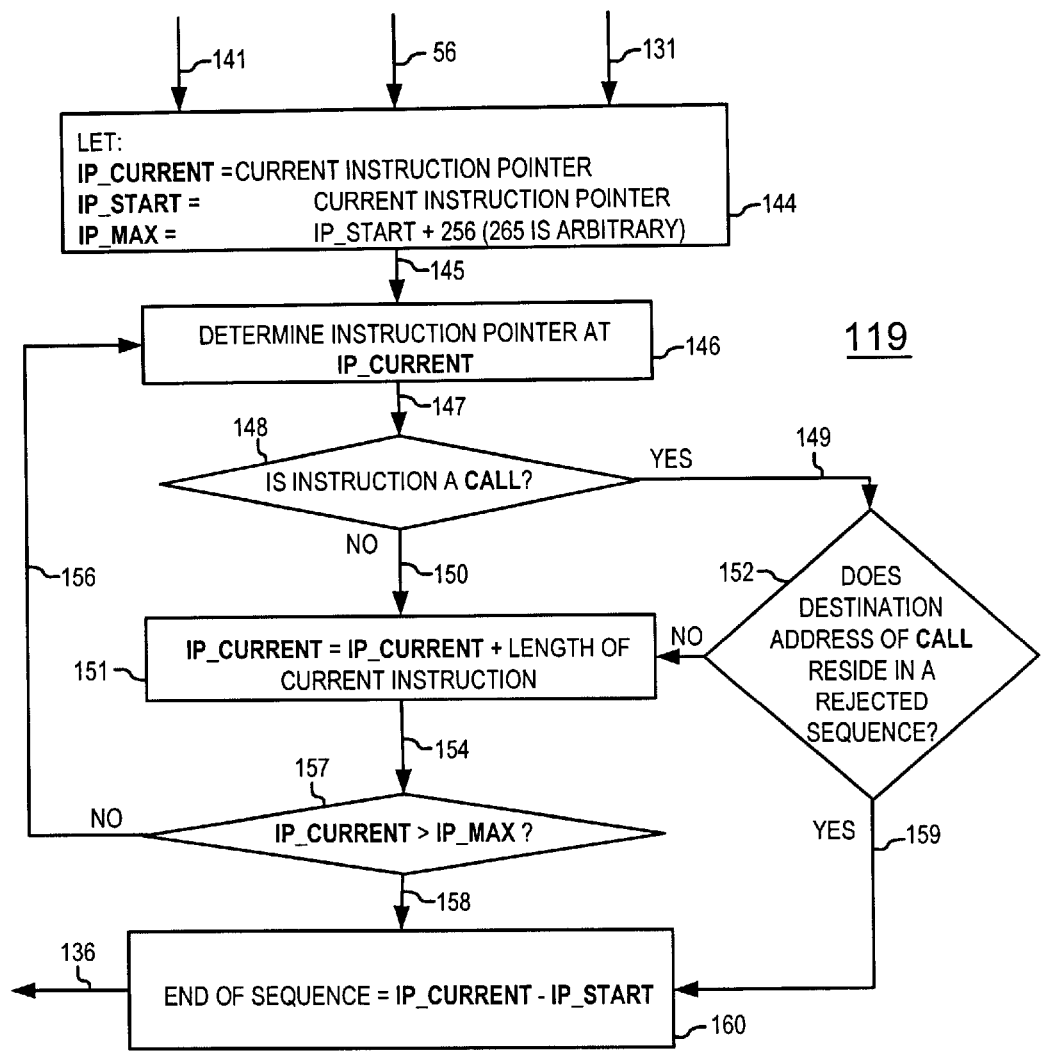
FIG. 7 depicts a block diagrammatic overview of the Software Profiler's operation during determination of the length of the instruction sequence during practice of the method of the instant invention.

FIG. 4 depicts an instruction sequence 298 as applied to the 8086 computer architecture. An instruction sequence 298 is composed of any number of sequential instructions. Instructions can be any form of data that controls the flow of execution of a computing device. The Software Profiler 10 of the preferred embodiment as depicted in FIG. 7 usually selects instruction sequences 298 that end with a Call instruction. A Call instruction, when executed, will cause the current address of the instruction pointer to be pushed onto the stack and then cause program execution to jump to another location. A Call instruction is usually paired with a RETurn instruction which causes the CPU to pop the return address and jump to that location. Thus by ending an instruction sequence 298 at a Call the number of instruction sequences 298 that need to be executed remotely will be reduced because when the CPU returns from the call it need not start another remote execution. The instant invention can be applied to any computer architecture and is not limited to 8086 machines. For example, the Java Virtual Machine has instruction sequences 298 that can be utilized by the instant invention.

The removal of a single instruction from a computer program typically does not result in a sufficiently complex relationship between inputs and outputs of the execution of the single instruction to permit protection because most computer systems have a small set of instructions that have a limited effect. By watching the inputs and outputs of the operation of a single missing instruction the instruction could be easily guessed, derived, or reverse engineered. For this reason, the instant invention uses a sequence of instructions which when grouped together have a combined effect that is much more complex and difficult to determine. The length of an instruction sequence 298 to be removed from the Original Software 9 and placed on the License Server 4 for remote execution is determined by the process shown in FIG. 7. An instruction sequence 298 can be thought of as a black box having only inputs and outputs. The inputs include any memory or CPU registers that are to be accessed by the execution of the instruction sequence 298. The outputs are any memory or CPU registers that are modified by the execution of the instruction sequence 298. Because the instant invention operates on instruction sequences 298 rather than on individual instructions, information for determining the execution differences (as discussed above) can be stored for an entire instruction sequence, thereby saving memory space and time. By running the program twice and recording the inputs and outputs of each of the instruction sequences 298, differences will result if the Software User 2 operates the software differently on the two runs. These differences are easily identified by matching the inputs of one run with those of another run. A difference is identified when no matches occur or the outputs differ for matched inputs.

By selecting instruction sequences 298 for removal from the Original Software 9 and remote execution on the License Server 4 that execute differently (i.e. have different inputs and outputs) during successive runs, the potential security problems due to playback or memory dumps/loads are eliminated. A problem exists, in that the Software Profiler 10 may remove instructions solely from the shutdown stage, in which case no real security is provided. In most applications, the shutdown stage is initiated by the Software User 2 selecting a quit option. After the Software User 2 has selected the quit option, the program in question begins shutting down and no longer needs user input. The Software Profiler 10 can thus watch the program as it reads input from the operating system during execution. After the program has finished execution, the Software Profiler 10 can determine the shutdown stage as beginning at the last location where the program read input from the operating system. That is, the program is considered to be in the shutdown stage when it no longer reads user input. The problem is thus solved in the preferred embodiment by having the Software Profiler 10 identify the last instruction sequence which reads input from the operating system as the beginning of the Original Software's 9 shutdown state of operation.

Some programs, now becoming rare, may not communicate directly with the user. Instead such programs only operate on a set of input files supplied by the user. In these programs, the shutdown stage must be signaled by the Software Vendor 3 or the application because there is no automatic method of detecting when the useful work has been accomplished and the shutdown stage begins. These types of non-interactive programs generally have very short shutdown stages an of selecting instruction sequences 298 strictly from the shutdown stage are very small. To eliminate the possibility that such an event could occur, the instruction sequences 298 could be selected by time, such that those executed the earliest in the program's history are most likely to be selected for remote execution by the Software Profiler 10.

Figure 5:
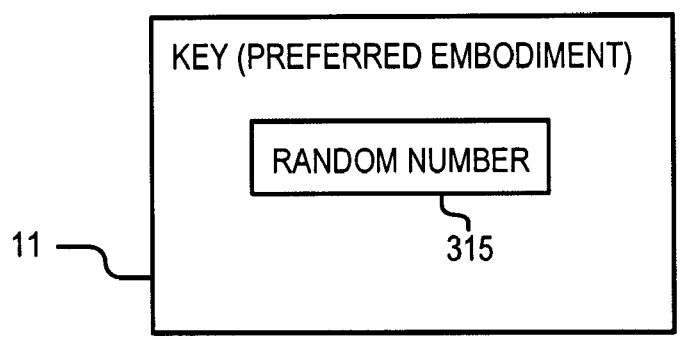
FIG. 5 depicts a block diagrammatic overview of a Key's components during practice of the method of the preferred embodiment of the instant invention.

FIG. 5 depicts a block diagrammatic overview of a Key 11 during practice of the method of the preferred embodiment of the instant invention. A Key 11, in the preferred embodiment, consists solely of a Random Number 315. Because the preferred embodiment of this method generates the Key 11 on the License Server 4, any information needing to be associated with the Key 11 can be associated and stored on the License Server 4 at the time of generation. Properties that can be assigned to the Key 11 include the identity of the software package that the Key 11 enables and additional License Information 301 (as seen in FIG. 17 depicting the second embodiment of the instant invention). License Information 301 can include, but is not limited to, the maximum number of simultaneous Software Users 2 per Key 11, network addresses allowed to use Key 11, time intervals that Key 11 may be used, cost per use of Key 11, and maximum uses of Key 11. By setting a maximum number of simultaneous Software Users 2 per Key 11, a group license can be created. As an example, if a company buys a license to run 200 copies of a software package, that company and all of its employees can share one Key 11 which allows a maximum of two hundred simultaneous Software Users 2. The License Server 4 keeps track of how many instances of the Key 11 are in use and only allows a maximum of two hundred Software Users 2 to simultaneously operate the licensed copy of the Modified Software 7. By associating a set of network addresses with a Key 11, a site license can be created. As an example, if a company has control over internet addresses 212.392.193.* where * represents any three digit number, then a Key 11 can be associated with a network mask that only allows access from Software Users 2 sending communications to the License Server 4 from addresses within the range defined by the network mask, effectively giving the company (Licensed User 2) unlimited usage of the software when operated within the company's network. By associating time intervals with the Key 11, time usage periods can be established, thus enabling trial versions, rental periods, and monthly/yearly subscription usage. Establishment of a time interval authorization for a Key 11 allows the Software Vendor 3 to sell usage of the software on a hourly or daily basis. By setting a maximum number of uses per User Key 5, the Software Vendor 3 can limit how many times the software can be run before the User Key 5 expires. Further categories of information can easily be associated with the User Key 5 to allow the Software Vendor 3 to gain very specialized control of the license and thus of the protected software. The Random Number 315 should be sufficiently large that it will not collide with (and thus not be unique) other Keys 11. Because the Key 11 can only be tested through the network, efforts to find Keys 11 through brute force can be detected and stopped.

A problem encountered with the method of the instant invention is that code executing remotely (on the License Server 4) executes more slowly because of the time of network transfer (communication 17). The selection of code to be removed from the Original Software 9 by the Software Profiler 10 is important to the level of security and to the speed at which the Modified Software 7 can execute. Finding code that will execute infrequently allows for faster execution time because fewer network communications 17 are required. Performance profilers which give a programmer an accurate view of where a program is spending most of it's execution time by using statistical sampling methods are not applicable to the instant invention. The instant invention tries to find sections of code in the Original Software 9 that are not executed often and using a statistical sampling method will have a high probability of missing these sections. Thus, the instant invention uses CPU emulation to trace through the complete execution cycle of the Original Software 9. Because CPU emulation is typically hundreds of times slower than normal execution, the instant invention will reject some instruction sequences 298 (as candidates for remote execution on the License Server 4) during the profile stage. These rejected sequences can then be allowed to execute natively on the Software Vendor's 3 CPU allowing the Software Vendor 3 to operate the Original Software 9 at interactive speeds during the profiling process.

An automatic method of code (understood to be a block of instruction sequences such as instruction sequence 298) removal from the Original Software 9 is implemented in the instant invention by the Software Profiler 10 (detailed in FIG. 6) which records the execution flow of a typical usage of the Original software 9 and analyzes the results. The Software Profiler 10 starts executing the Original Software 9, using either machine emulation or hardware step/trace functionality, by having software object 55 prompt the user (Software Vendor 3) for a program (the Original Software 10) to profile, loading the program identified by the user, and finding the starting execution point of the program. The Original Software 9 is communicated 18 to the Software Profiler's 10 software object 55. After the software object 55 has found the starting execution point, it communicates 56 the Original Software 9 to the software object 119 which determines the length of the instruction sequence 298 starting at the starting point instruction pointer (IP). After the length of the instruction sequence 298 starting at the IP (instruction pointer) that has been determined by software object 119 (detailed in FIG. 7) the length of the instruction sequence 298 is communicated 136 to the software object 123 which determines whether the instruction sequence 298 has already been rejected. If the software object 123 determines that the instruction sequence 298 has already been rejected, then this information is communicated 132 to software object 121 which acts to permit the instruction sequence 298 to execute natively in the Modified Software 7. Software object 121 executes the program being profiled (a copy of the Original Software 9) until it hits a breakpoint. This breakpoint is communicated to software object 120 which acts to restore the instructions replaced by the breakpoint and returns to emulation mode. The fact that the software is now executing in emulation mode is communicated 131 to software object 119. If the software object 123 determines that the instruction sequence 298 has not already been rejected, the instruction sequence 298 is communicated 137 to a software object 124 which determines whether the instruction sequence 298 can be rejected. If the software object 124 determines that the instruction sequence 298 can be rejected, then software object 124 communicates 133 this information to software object 122. Software object 122 then places breakpoint instructions (in RAM at the end of the instruction sequence 298 as well as any point in RAM where the CPU would jump out of the instruction sequence 298. The memory at the locations where the breakpoints have been placed should be saved such that when the CPU hits a breakpoint in the operation, the process is interrupted and the original instructions can be restored. Software object 122 communicates to software object 121 that the program is ready to begin native execution. if the software object 124 determines that the instruction sequence 298 can not be rejected, it communicates 138 the instruction sequence 298 to software object 125 which then records the instruction sequence 298 input state and communicates 139 this information together with the instruction sequence 298 to software object 126. The software object 126 then emulates the operation of the instruction sequence 298 and records the outputs of the instruction sequence 298. The input and output of an instruction sequence 298 is considered to be all of memory and all CPU registers, however, storing the entire state of the input and output would require too many resources, so instead the changes (or differences) between the input and output can be stored. These changes can be determined during the process of emulating the instruction sequence 298.

Figure 9:
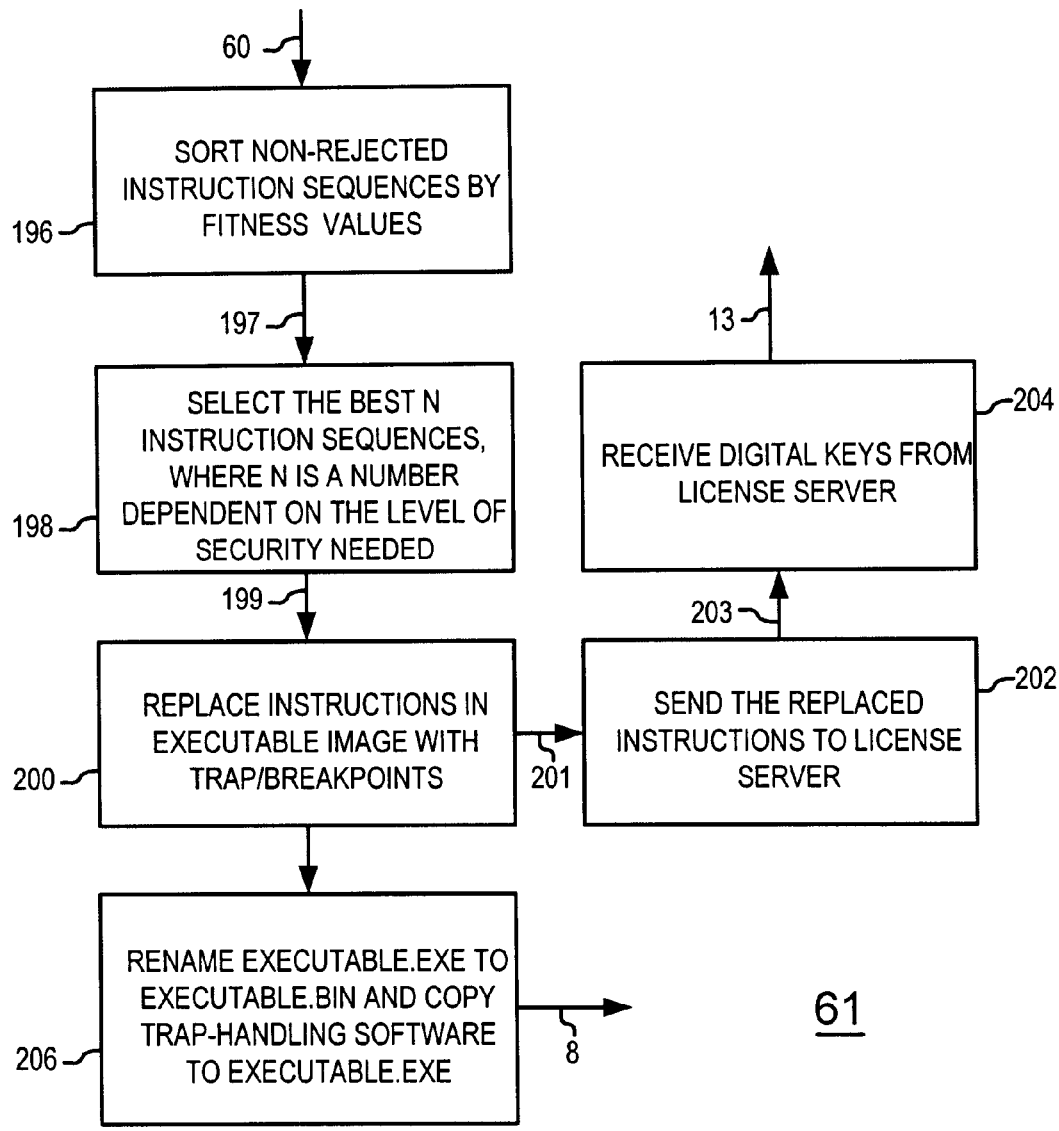
FIG. 9 depicts a block diagrammatic overview of the Software Profiler's operation during selection of the instruction sequences to be placed on the License Server during practice of the method of the instant invention.

The instruction sequence 298 emulated, as described in the preceding paragraph, is communicated 140 from software object 126 to software object 128. Software object 128 then makes a determination as to whether the execution of the Original Software 9 has completed, i.e. whether the end of the program has been reached, and communicates 142 a "no" determination to software object 127 or communicates 143 a "yes" determination to software object 54. Receipt of a "no" determination by software object 127 from software object 127 to change the instruction pointer to the end of the instruction sequence 298 just emulated and to continue operation of the Original Software 9. Receipt of a "yes" determination by software object 54 from software object 128 causes software object 54 to save the inputs and outputs for the entire execution of the Original Software 9 as recorded by software objects 125 and 126. Software object 54, then determines if this was the first or second execution of the Original Software 9. If this was the first execution, software object 54 communicates 129 this fact to software object 55 which acts to begin the profiling process again. If this was the second execution of the Original Software 9, then software object 54 communicates 67 this fact to software object 59. Software object 59 acts to determine which instruction sequences 298 are eligible for removal and communicates 60 such instruction sequences 298 to software object 61. Software object 61, upon receipt of communication 60 from software object 59, acts to select N instruction sequences 298 sorted by fitness (discussed below), remove them from the Original Software 9 (creating Modified Software 7), and send/communicate 13 the removed instruction sequences 298 to the License Server 4. Detail of the operation of software object 61 is depicted in FIG. 9. The number N can be chosen to reflect the level of security desired. The fitness of an instruction sequence 298 is determined by matching the inputs and outputs recorded by software objects 125 and 126 from both execution #1 and execution #2 of the Original Software 9. The fitness (or security) of an instruction sequence 298 is equal to the number of input matches with corresponding output differences plus the number of input differences. To further explain this, suppose "A" is an instruction sequence 298 which was executed 50 times during execution #1, and 100 times during execution #2. For each input from execution #1 that matches the input in execution #2, the output is tested for a match. If 49 of the executions match inputs, the outputs of those 49 executions are tested to see if they produced the same result. If 40 of those 49 executions resulted in the same output, then a starting fitness of 9 is used (49−40). Next, the inputs to the instruction sequence 298 "A" (from execution #1 and #2) are tested for non-matches. Assuming that redundancies are removed when an instruction sequence 298 has the same input and output more than once, this would make 51 mismatches (100−49). The total fitness for the instruction sequence 298 "A" would be 60 (9+51).

As seen in the detailed description in the foregoing paragraphs, the Software Profiler 10 acts to determine which instruction sequences 298 should be executed locally and which should be executed on the License Server 4. This determination occurs partially while the Software Profiler 10 is executing the Original Software 9, and partially after the Software Profiler 10 has traced two complete executions of the Original Software 9 and examined the executions for differences as described above. Those instruction sequences 298 that are selected by the Software Profiler 10 to execute on the License Server 4 are transferred to the License Server 4. Those instruction sequences 298 which are determined to execute locally are used to form the Modified Software 7, which is later communicated 15 to a Software User 2. The Software Profiler 10 inserts Breakpoint/Trap instructions into the Modified Software 7 at the locations where instructions were removed so that when there is an attempt to execute them, the Trap Software 6 will be able to request they be executed by the License Server 4.

Figure 6:
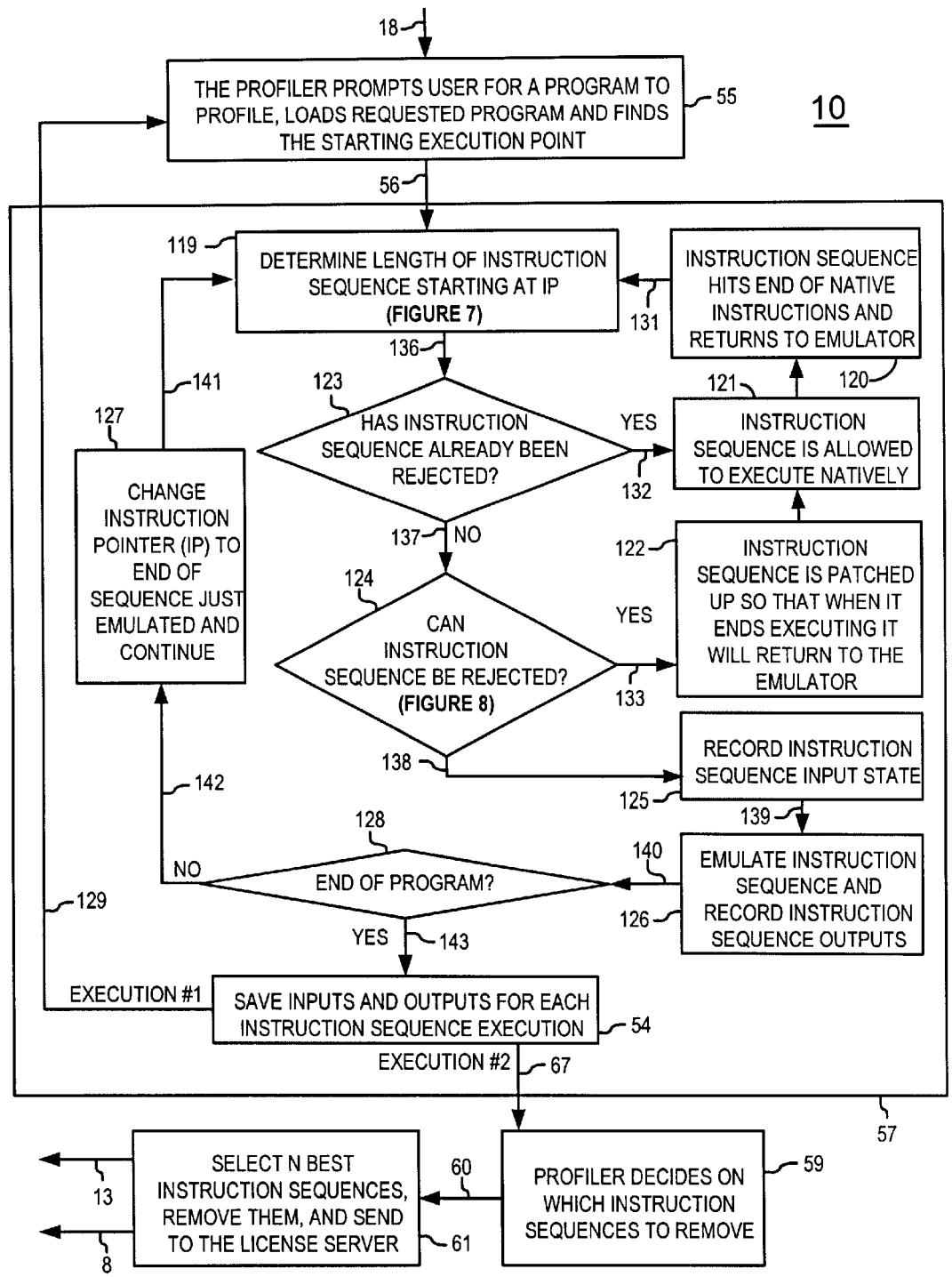
FIG. 6 depicts a block diagrammatic overview of the operation of the Software Profiler during practice of the method of the instant invention.

FIG. 7 provides detailed information regarding the Software Profiler's 10 determination of the length of an executable instruction sequence 298 to be removed from the Modified Software 7 and placed on the License Server 4. As seen in FIG. 7, software object 119, and more precisely software object 144 within software object 119, has communicated 141 to it from software object 127 (FIG. 6) the current execution point of the Modified Software 7. This current execution point is IP_Start, the current instruction pointer. Software object 144 also sets IP_Current to the current instruction pointer of the Modified Software 7 and sets IP_Max to IP_Start plus an arbitrary number, shown in FIG. 7 as 256. Software object 144 then communicates 145 these parameters, IP_Start, IP_Current, and IP_Max to software object 146. Software object 146 determines the length of the instruction at IP_Current and communicates 147 this information to software object 148. Software object 148 determines whether the instruction communicated 147 to it is a Call. If the determination by software object 148 is that the instruction is a Call, then this information is communicated 149 to software object 152. Software object 152 determines whether the destination address of the Call resides in a rejected code sequence. If the destination address of the Call does reside in a rejected code sequence, this information is communicated 159 to software object 160. if the destination address of the Call does not reside in a rejected code sequence, this information is communicated to software object 151. Software object 160 sets the instruction pointer for the end of the instruction sequence 298 as being IP_Current minus IP_Start and communicates 136 this information to software object 123 (FIG. 6). Software object 151 sets IP_Current at IP_Current plus the length of the current instruction and then communicates 154 P_Current to software object 157. Software object 157 determines whether IP_Current is greater than P_Max and, if so, communicates 158 this information to software object 160. If software object 157 determines that IP_Current is not greater than IP_Max, then software object 157 communicates 156 this information to software object 146 which, again, acts to determine the nature and length of the instruction at IP_Current.

Figure 8:
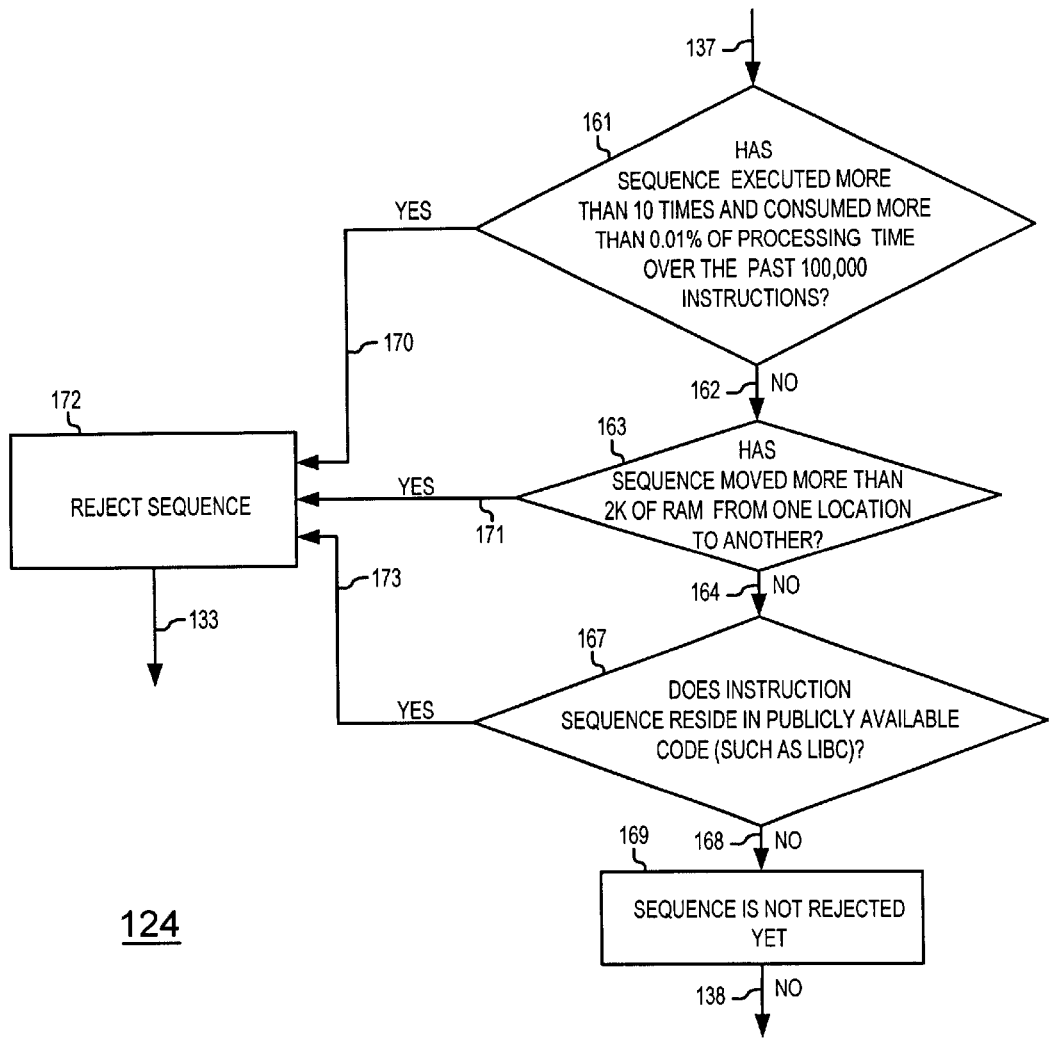
FIG. 8 depicts a block diagrammatic overview of the Software Profiler's operation during determination of whether to reject an instruction sequence during practice of the method of the instant invention.

FIG. 8 provides detail of the operation of software object 124, which acts to determine if an instruction sequence 298 can be rejected as a candidate for removal from Original Software 9. Software object 161 (contained within software object 124) receives communication 137 of the instruction sequence 298 under consideration and the fact that such instruction sequence 298 has not previously been rejected as a candidate for removal to the License Server 4. Software object 161 then acts to make a determination as to whether the instruction sequence 298 has been executed more than ten times and consumed more than 0.01% of the processing time over the past one hundred thousand instructions. The criteria stated are those arbitrarily selected and used in the preferred embodiment, obviously the criteria could be selected differently (for example, executed more than 33 times or consumed more than 0.002% of the processing time during the last 21,000 instructions) without departing from the instant invention. If the software object 161 determines that yes, the selection criteria has been met, then this fact is communicated 170 to software object 172 which, in turn, produces a reject sequence signal and communicates 133 that signal to software object 122 (FIG. 6). If the software object 161 determines that the selection criteria has not been met, then this fact is communicated 162 to software object 163. Software object 163 then determines whether the instruction sequence 298 under consideration has caused the movement of more than two kilobytes of data in RAM (volatile memory) from one location to another. Again, the two kilobyte size is arbitrarily selected and could be selected as five kilobytes or 500 bytes, a larger size selection will result in a slower execution of the Modified Software 7 over the network because of the volume of data to be communicated 17 to and from the License Server 4. If the software object 163 determines that the instruction sequence 298 under consideration has occasioned the movement of more than two kilobytes of data from one location to another in RAM this information is communicated 171 to software object 172. If the software object 163 determines that the instruction sequence 298 under consideration has not occasioned the movement of more than two kilobytes of data from one location to another in RAM, then information is communicated 164 to software object 167. Software object 167 acts to determine whether the instruction sequence 298 under consideration resides in a standard library of instruction sequences 298, such as libc. If software object 167 determines that the instruction sequence 298 under consideration does reside in a standard library, this information is communicated 173 to software object 172. If software object 167 determines that the instruction sequence 298 under consideration does not reside in a standard library, this information is communicated 168 to software object 169. Software object 169 then acts to communicate 138 to software object 125 (FIG. 6) the information that the instruction sequence 298 under consideration is not rejected yet.

FIG. 9 details the method by which the Software Profiler 10 determines which instruction sequences 298 to remove from the Original Software 9 when creating the Modified Software 7. As seen in FIG. 9, software object 196 has communicated 60 to it, from software object 59 (FIG. 6), the information that the running of the Original Software 9 in emulation mode has ended. Upon receipt of such information, software object 196 sorts the non-rejected instruction sequences 298 by the measured fitness (discussed above). Software object 196 then communicates 197 the sorted instruction sequences 298 to software object 198 which acts to select the best (most fit) N instruction sequences 298, where N is a number dependent upon the level of security selected by the Software Vendor 3. The selected N instruction sequences 298 are then communicated 199 by software object 198 to software object 200. Software object 200 acts to replace the N selected instruction sequences 298 in the executable image (on disk) of the software being modified for use pursuant to the method of the instant invention. Each selected instruction sequence 298 is replaced in the Modified Software 7 with a series of traps or break points. Software object 200 next communicates 201 the replaced instruction sequences 298 to software object 202. Software object 202 then acts to communicate the selected instructions to the License Server 4. Software object 202, upon completion of the transfer to the License Server 4, communicates 203 the fact of completion to software object 204. Software object 204 then acts to receive from the License Server 4 the Keys 11 which may be distributed by the Software Vendor 3 to the Software Users 2 (see FIG. 1) at which time they are refered to as User Key 5. The process of receiving (purchasing) Keys 11 from the License Agent I through the License Server 4 may occur at any later time as well as the Software Vendor 3 desires to purchase more keys. Software object 204 communicates the fact of the receipt of the Keys 11 to software object 206 which then acts to rename executable.exe to executable.bin and copy Trap Software 6 to exectable.exe, the Modified Software 7. Software object 204 then communicates 13 the selected instruction sequences 298 to software object 46 (FIG. 3).

Figure 10:
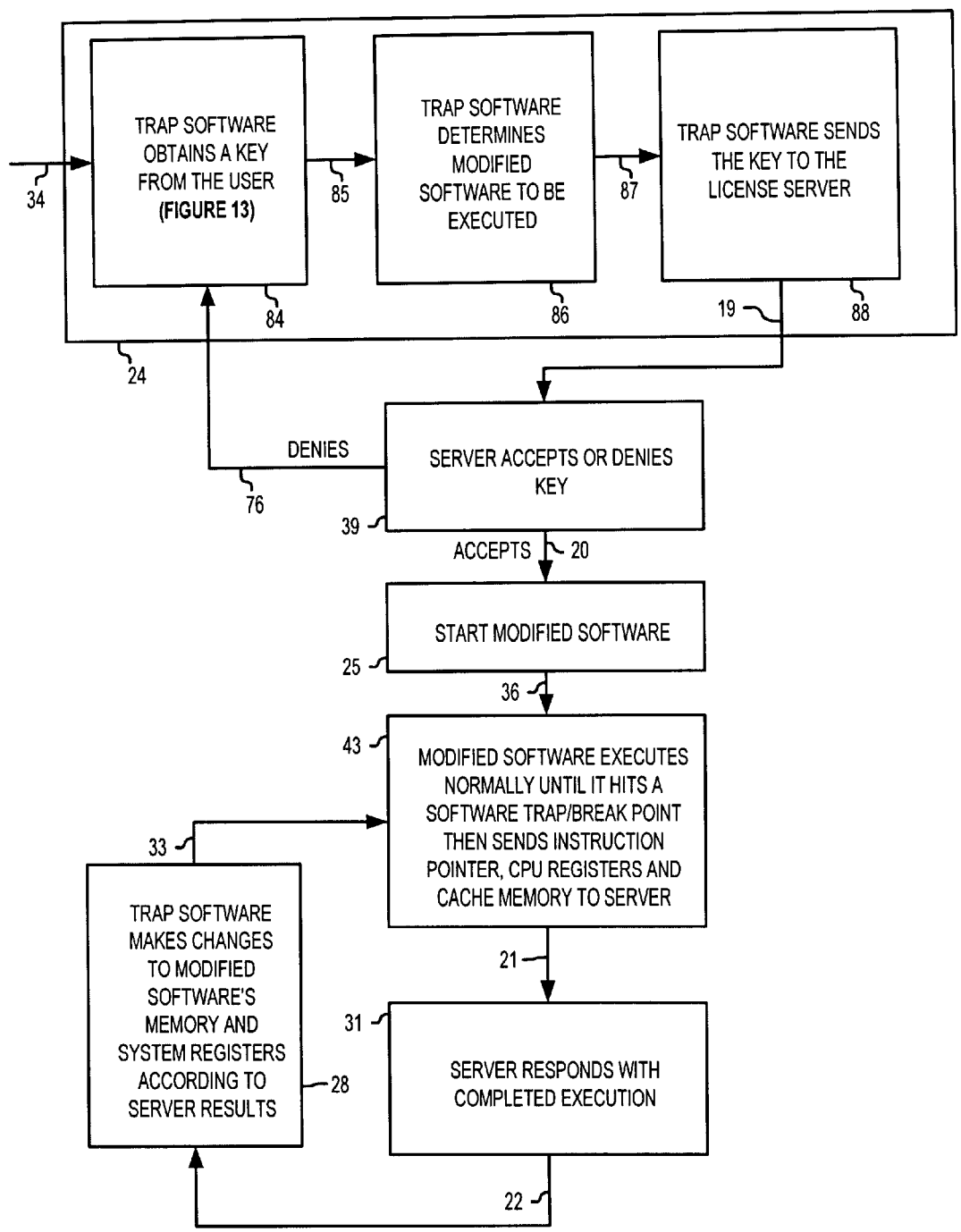
FIG. 10 depicts a block diagrammatic overview of the operation of the Trap Software and its interaction with the License Server during practice of the method of the instant invention.

FIG. 10 depicts a block diagrammatic overview of the operation of the Trap Software 6 and its interaction with the License Server 4 during practice of the method of the instant invention. Trap Software 6 begins execution upon receipt of a signal communicated 34 by the Software User's 2 operating system to software object 84. Software object 84 acts to request a User Key 5 from the Software User 2 and communicates 85 the User Key 5 to software object 86. Software object 86 acts to determine which Modified Software 7 is to be executed and communicates 87 the address/location of such Modified Software 7 together with the User Key 5 to software object 88. One method of determining which Modified Software 7 to execute would be for the Trap Software 6 to execute that Modified Software 7 that has the Trap Software's 6 filename with a different extension. I.e. if the Trap Software 6 is named executable.exe, then it determines the Modified Software 7 as being executable.bin. This method of associating the Trap Software 6 with the Modified Software 7 to executed is utilized in the preferred embodiment. Software object 88 acts to communicate 19 the User Key 5 obtained by software object 84 to the License Server's 4 software object 39. After the User Key 5 has been communicated 19 to the License Server 4, software object 39 communicates 20 the fact of the License Server's 4 acceptance of the User Key 5 to software object 25 or communicates 76 the License Server's 4 denial of the User Key 5 to software object 84. If the License Server 4 rejects the User Key 5, software object 39 acts to communicate 76 this information to software object 84 which requests a new User Key 5 from the Software User 2 and repeats the process (of requesting and obtaining a User Key 5) again. If the License Server 4 accepts the User Key 5, the software object 39 communicates 20 this fact to software object 25. Software object 25 acts to load the Modified Software 7 and install trap/breakpoint handlers. These trap/breakpoint handlers are called by the Trap Software 6 when the Modified Software 7 tries to execute a breakpoint instruction. Software object 25 acts to communicate 36 the fact that the Modified Software 7 has begun to execute to software object 43. When the Modified Software 7 encounters a breakpoint instruction software object 43 acts to communicate 21 the instruction pointer, CPU registers, and cache memory to the License Server's 4 software object 31. Software object 43 also communicates 21 to software object 31 that software object 43 has sent the state (the instruction pointer and CPU registers) of the Modified Software 7 to the License Server 4. Software object 31, upon a receiving a message from the License Server 4 communicating successful execution completion, communicates 22 this message to software object 28. Software object 28 acts to change the Modified Software's 7 memory and CPU registers according to the results of the License Server's 4 execution. Software object 28 then communicates 33 the fact that the Modified Software 7 is ready to continue execution to software object 43 which acts to continue execution of the Modified Software 7 and this process (executing until a breakpoint is encountered and then executing a request on the License Server 4) is repeated until the Modified Software's 7 execution has terminated.

Figure 11:
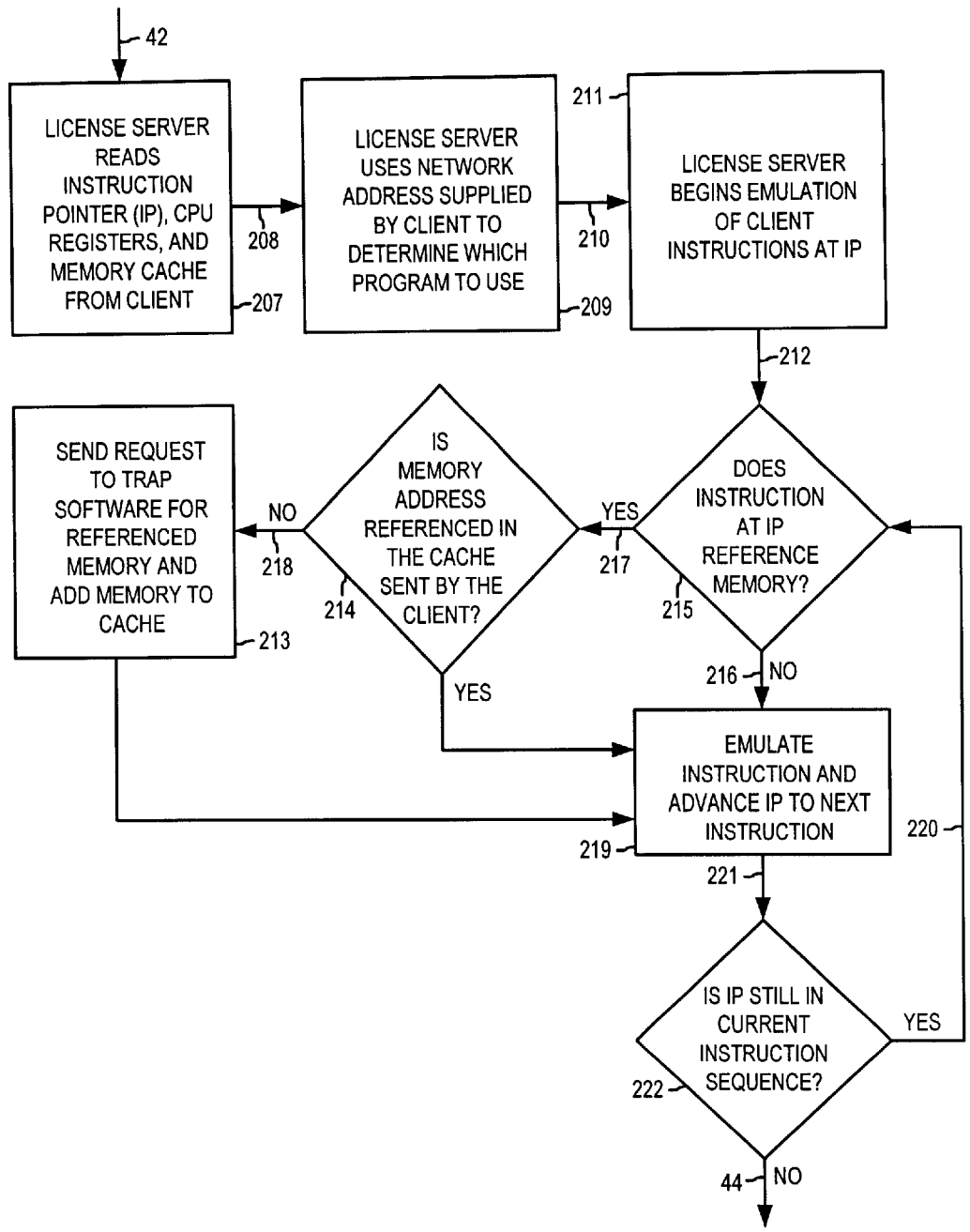
FIG. 11 depicts a block diagrammatic overview of the operation of Software Object 74, within the License Server, upon receipt of request for service from a licensed Software User during practice of the method of the instant invention.

FIG. 11 provides detail regarding the License Server's 4 execution of instructions for the Trap Software 6. After the software object 72 determines that the Trap Software 6 address has been properly verified, it communicates 42 this information to software object 207. Software object 207 reads the instruction pointer (IP), CPU registers and memory cache from the client (Trap Software 6). Software object 207 then communicates 208 the client's (Trap Software's 6) instruction pointer (IP), CPU registers and the client's (Software User's 2) network address to software object 209. Software object 209 then uses the network address of the client (Software User 2), as communicated 208 to software object 209 by software object 207, to determine which set of many sets of instruction sequences 298, one (ideally, theoretically, and in the preferred embodiment) set for each copy of the Modified Software 7, to use. The set to be used is determined by the key (User Key 5) supplied earlier by the client (Trap Software 6/Software User 2). The information regarding which instruction sequence 298 set to use is communicated 210 from software object 209 to software object 211. Software object 211 then begins emulation of the removed Original Software's 9 instructions, the instructions having been earlier communicated 13 to the License Server 4 by the Software Profiler 10, by determining what the instruction sequence 298 is at IP (client's Instruction Pointer). As Software object 211 emulates the instruction sequence 298, it communicates 212 the current instruction pointer to software object 215. Software object 215 makes a determination of whether the instruction sequence 298 references a memory location. If software object 215 determines that a memory location is referenced by the instruction sequence 298, this information is communicated 217 to software object 214. If software object 215 determines that a memory location is not referenced by the instruction sequence 298, this information is communicated 216 to software object 219. Software object 214 makes a determination of whether the memory address referenced by the instruction sequence 298 is present in the memory cache already sent by the Trap Software 6. If the memory address referenced by the instruction sequence 298 is present in the cache sent by the Trap Software 6, this fact is communicated to software object 219. If the memory address referenced by the instruction sequence 298 is not present in the cache sent by the Trap Software 6, this information is communicated 218 to software object 213. Software object 213 makes a request of the client (Trap software 6) for the referenced memory address contents and, upon receipt, adds those contents to the cache previously sent by the client (Trap Software 6). Software object 213 communicates to software object 219 the completion of software object's 213 action of adding the contents to the cache. Software object 219 can now fully act to emulate the current instruction and advance the instruction pointer to the next instruction. Software object 219 communicates 221 the completion of the execution of the instruction to software object 222. Software object 222 makes a determination of whether the instruction pointer is still in the current instruction sequence 298. If the instruction pointer is still in the current instruction sequence 298, software object 222 then communicates 220 this fact to software object 215 10 which repeats its prior action until all of the instructions in the instruction sequence 298 have been executed. If the instruction pointer is not still in the current instruction sequence 298, software object 222 then communicates 44 this information to software object 45. Software object 45 acts to communicate 22 the new instruction pointer, CPU registers, and memory cache to software object 28 in the Trap Software 6.

Figure 12:
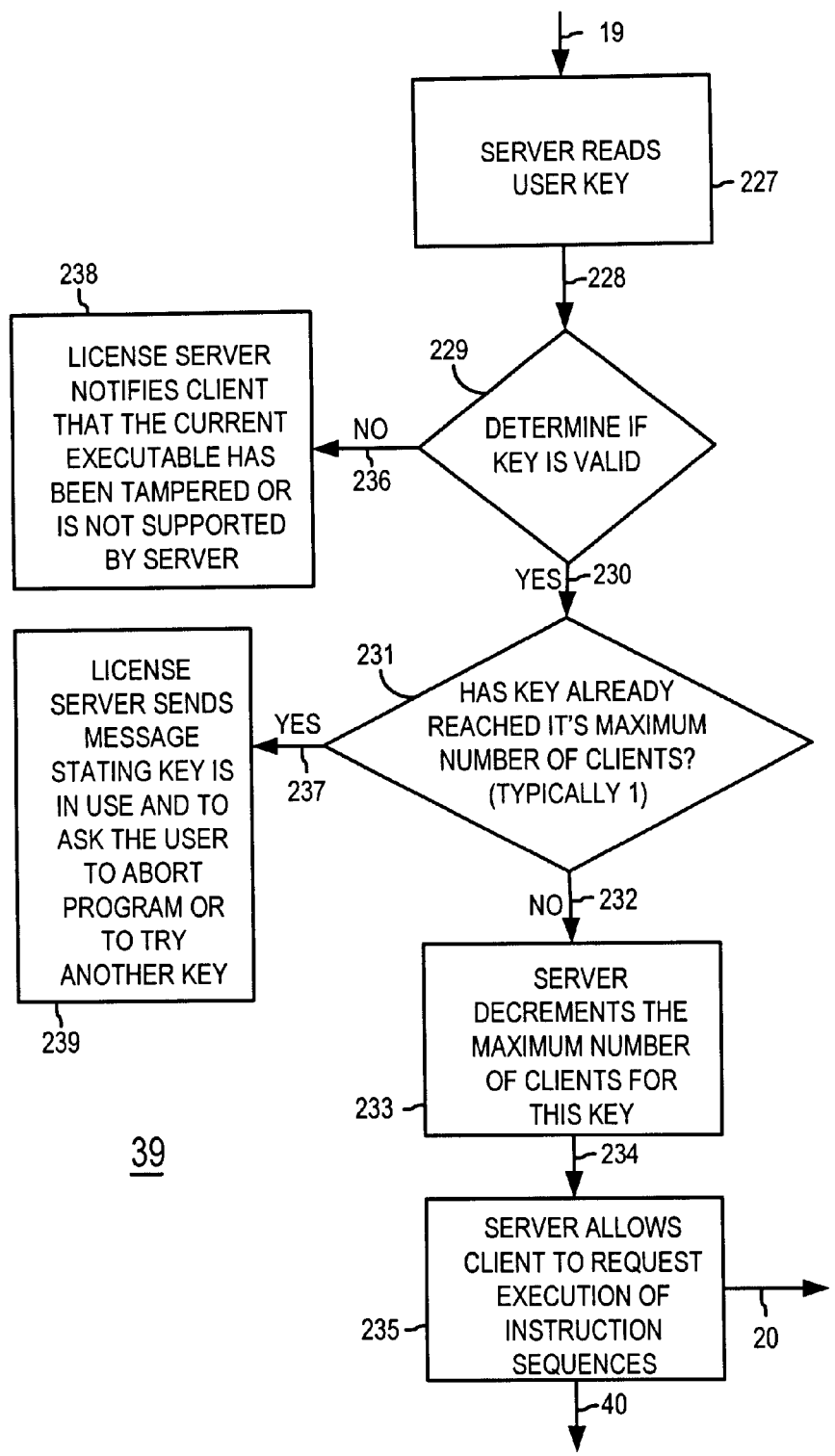
FIG. 12 depicts a block diagrammatic overview of the operation of Software Object 39, within the License Server, upon receipt of a User Key from a licensed Software User during practice of the method of the instant invention.

FIG. 12 provides detail regarding the License Server's 4 request to the Trap Software 6 for the User Key 5. As seen in FIG. 107 the communication 19 from software object 88 is that a Trap Software 6 request has been received, but that the Trap Software 6 address has not been verified. Software object 227 reads the Trap 20 Software 6 request, communication 19, and thereby obtains the User Key 5. Software object 227 then communicates 228 the User Key 5 to software object 229. Software object 229 determines whether the User Key 5 is valid. If the User Key 5 is valid this fact is communicated 230 by software object 229 to software object 231. If the User Key 5 is not valid, this fact is communicated 236 by software object 229 to software object 238. Software object 238 acts to notify the Software User 2 through communication with the client (Trap Software 6) that the User Key 5 is invalid. Software object 231 acts to determine whether the User Key 5 has already reached its maximum number of clients (Trap Softwares 6) (typically the Software Vendor 3 sets this maximum number at one). If the User Key 5 has already reached its maximum number of clients (Trap Softwares 6), then software object 231 communicates 237 this fact to software object 239. If the User Key 5 has not already reached it's maximum number of clients (Trap Softwares 6), then software object 231 communicates 232 this fact to software object 233. Software object 239 acts to send a message to the Software User 2 through communication with the client (Trap Software 6) stating that the User Key 5 is in use and to ask the Software User 2 to abort the operation of the Modified Software 7 or to try another User Key Software object 233 acts to decrement the maximum number of clients (Trap Softwares 6) that are available for use with the particular User Key 5. Software object 233 communicates 234 the completion of the process of decrementing the maximum number of clients (Software Users, each identified by their Trap Software 6) to software object 235. Software object 235 acts to permit the Trap Software 6 to request remote execution of instructions on the License Server 4. Software object 235 communicates 20 the fact that the User Key 5 tendered by the Software User 2 is valid to software object 25 (FIG. 10), and also communicates 40 such fact to software object 72 (FIG. 2).

Figure 13:
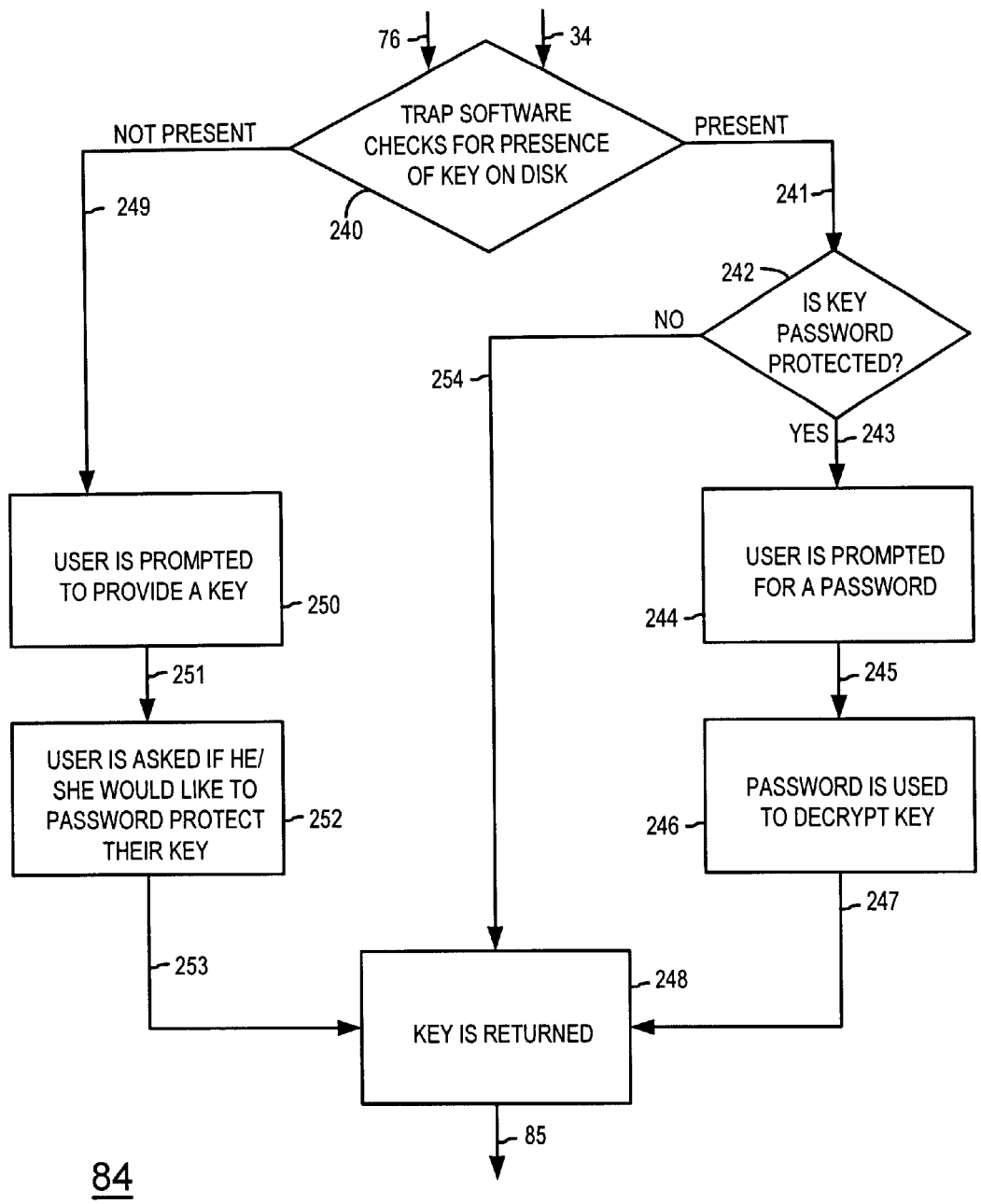
FIG. 13 depicts a block diagrammatic overview of the operation of Software Object 84, within the Trap Software, when selecting a License Server during practice of the method of the instant invention.

FIG. 13 details the method by which the Trap Software 6 obtains a User Key 5 from the Software User 2. The request for a User Key 5 is communicated 76 from the License Server's 4 software object 39 (see FIG. 10). Software object 240 (encompassed within Trap Software 6) receives the request and checks for the presence of the User Key 5 on the Software User's 2 long term storage disk (hard drive). If software object 240 determines that the User Key 5 is present, this fact is communicated 241 to software object 242. If software object 240 determines that the User Key 5 is not present, this fact is communicated 249 to software object 250. Software object 250 prompts the Software User 2 to provide a User Key 5 and communicates 251 the fact of having made such prompt to software object 252. Software object 252 asks the Software User 2 if he wishes to password protect his User Key 5 and stores the received User Key 5 to disk (possibly encrypted with a password). Software object 252 communicates 253 the User Key 5 to software object 248. If the User Key 5 is password protected, software object 242 communicates 243 this information to software object 244. If the User Key 5 is not password protected, software object 242 communicates 254 this information to software object 248. Software object 244 prompts the Software User 2 for the required password and communicates 245 the received, if any, password to software object 246. Software object 246 utilizes the password to decrypt the User Key 5 and communicates 247 the decrypted User Key 5 to software object 248. Software object 248 communicates 85 (see FIG. 10) the User Key 5 to software object 86.

Figure 14:
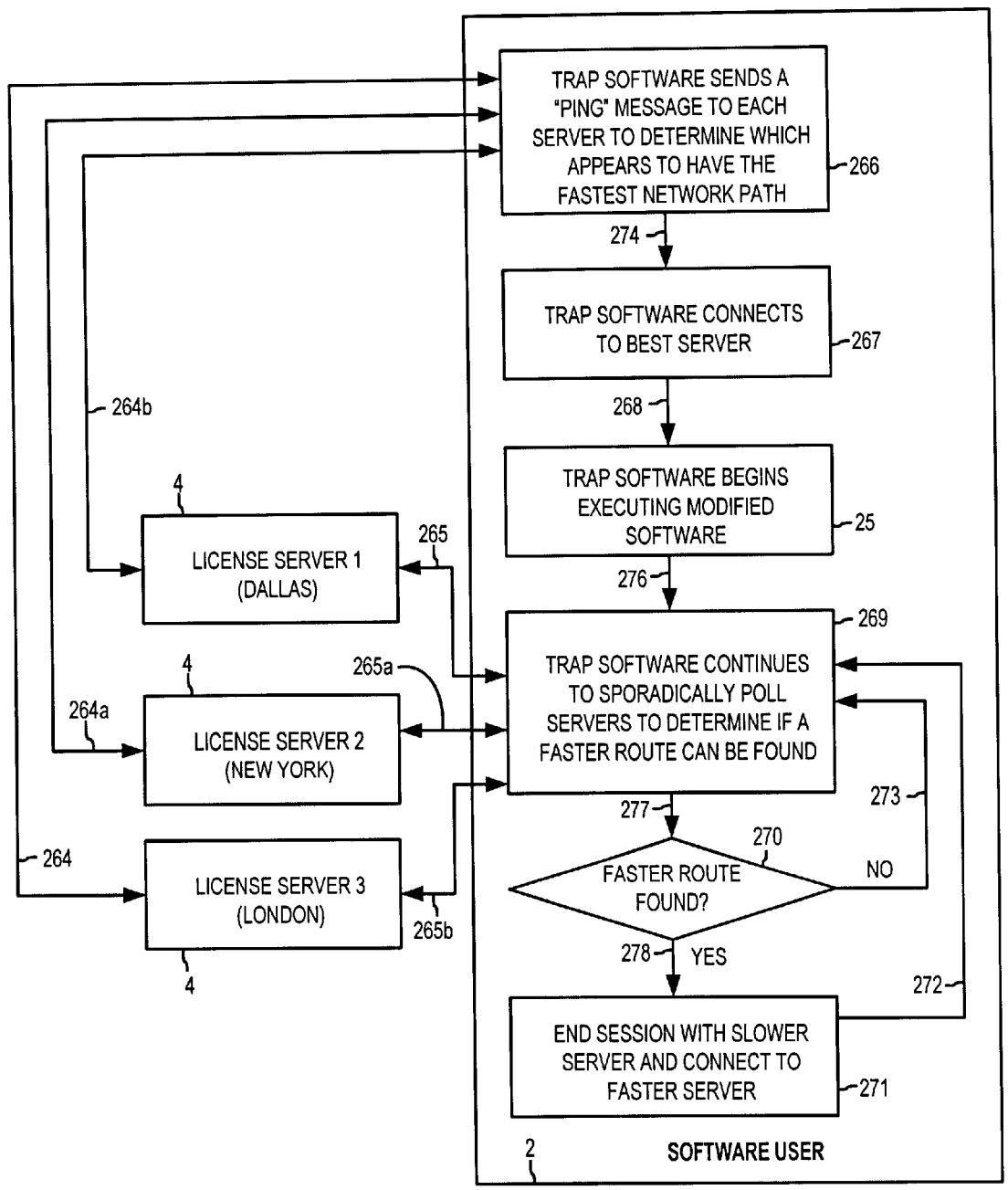
FIG. 14 depicts a block diagrammatic overview of the operation of the Trap Software determining, connecting to, and executing the Modified Software over the License Server providing the fastest network response time during practice of the method of the second embodiment of the instant invention.

FIG. 14 depicts a block diagrammatic overview of the operation of the Trap Software 6 determining, connecting to, and executing the Modified Software 7 in cooperation with the License Server 4 (selected from a set of available License Server's 4) having the fastest network response time at the time of the Trap Software's 6 request for service from the License Server 4. In order to locate the fastest network route to a License Server 4, software object 266 (contained within the Trap Software 10) communicates 264 a "ping" message to each License Server 4 known to software object 266 in order to determine which License Server 4 has the fastest network response time. A "ping" measures the amount of time it takes a small packet of bytes to travel to and from a given network address, in this instance the address of each of the known License Servers 4. By measuring the average ping time to each License Server 4, an estimate can be formed as to which License Server 4 will provide the fastest service for the Trap Software's 6 request. Software object 266 communicates 274 the ping information (network address of the License Server 4 providing the quickest response time) to software object 267 which then acts to make a network connection from the Software User 2 to the best (smallest average ping time) License Server 4. Software object 267 communicates 268 to software object 25 that the connection to the License Server 4 has been established, and software object 25 begins executing the Modified Software 7. The Modified Software 7 continues to execute as described previously until a Trap/Breakpoint is encountered or the execution terminates. While the Modified Software 7 executes, software object 25 periodically communicates 276 to software object 269 the request to search for the License Server 4 having the quickest network response time. Software object 269 communicates 265 an identical ping query to each of the known License Servers 4. The results of the network ping query is communicated 277 by software object 269 to software object 270 which checks to see if a faster route to a License Server 4 was found. If software object 270 determines that a faster route than the route to the currently connected License Server 4 was found, then the network address of the License Server 4 having the faster ping query response time is communicated 278 by software object 270 to software object 271 which terminates the connection with the License Server 4 having the slower ping query response time and makes a connection to the License Server 4 having the faster ping query response time. Software object 271 then communicates 272 a control signal to software object 269 where the process of making a ping query of all known License Servers 4 is repeated periodically while the Modified Software 7 continues to execute. If software object 270 determines that a faster route (a network connection having a lower ping query response time) to a License Server 4 was not found, then software object 270 does not communicate 278 a new License Server 4 network address to software object 271 whereby the Software User 2 stays connected to the previously selected License Server 4 and software object 270 communicates 273 a reset signal to software object 269. In this manner, the Trap Software 6 always maintains a connection to the fastest route to a License Server 4, protecting the Software User 2 against the possibility of a License Server 4 crashing or becoming unavailable during the Software User's 2 execution of the Modified Software 7, and also providing Software User 2 with the highest possible execution speed of Modified Software 7.

Figure 15:
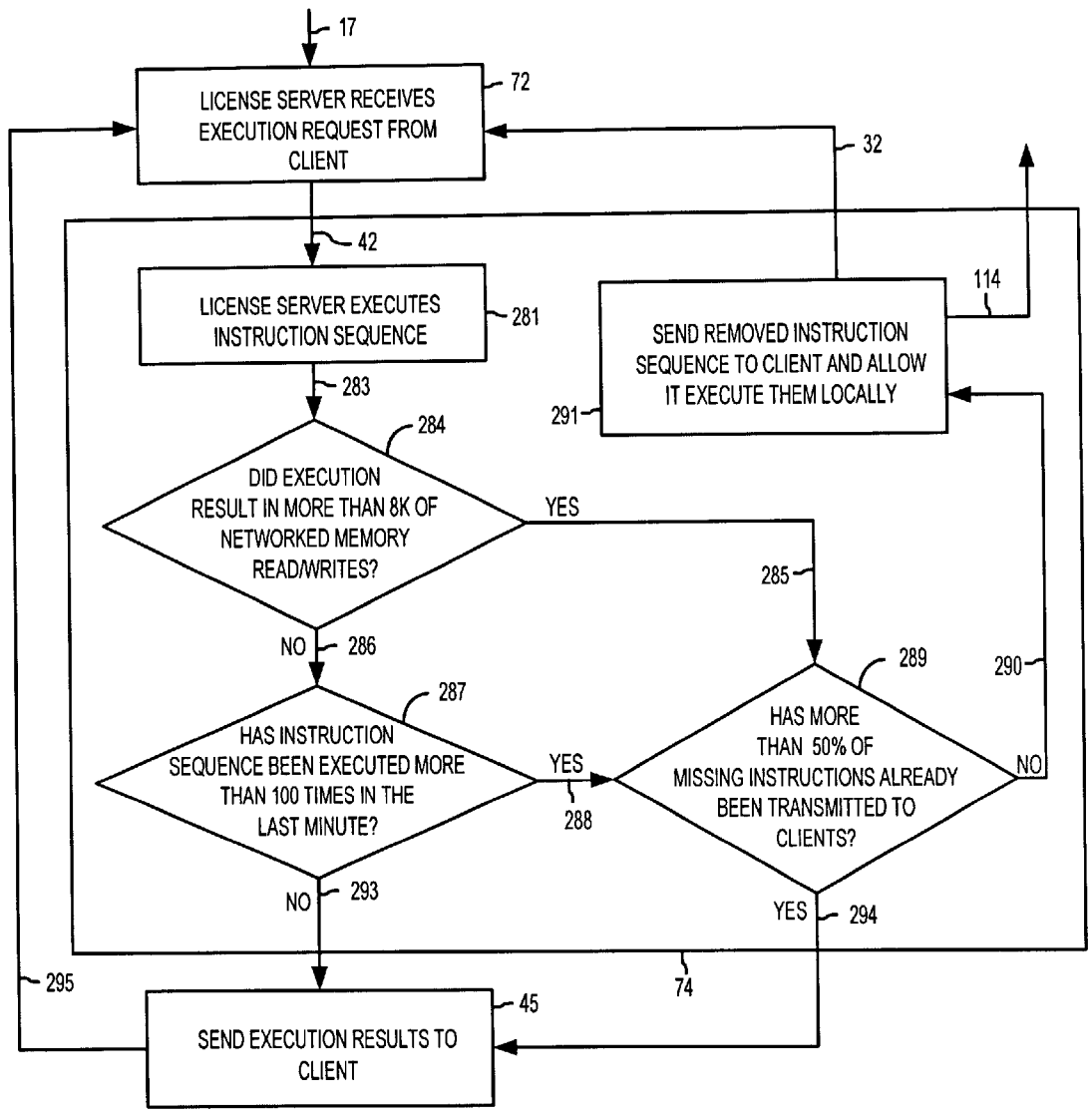
FIG. 15 depicts a block diagrammatic overview of the operation of the License Server transferring poorly chosen instruction sequences to the Software User to execute locally without compromising the security of the licensed software during practice of the method of the instant invention.

FIG. 15 depicts a block diagrammatic overview of how poorly selected (by the Software Profiler 10) instruction sequences 298 can be transferred to the Software User 2 to execute locally without compromising the security of the software. Because Software Profiler 10 examines the Original Software 9 under run conditions established by the Software Vendor 3, it is possible for the Software Profiler 10 to underestimate the frequency at which an instruction sequence 298 within the Original Software 9 will be executed by the Software User 2. This could result in a large number of network communications 17 between the Trap Software 6 and the License Server 4, which would result in slower than expected Modified Software 7 execution speeds. To correct for this problem, instruction sequences 298 which are determined by the License Server 4 to be poor candidates for remote execution on the License Server 4 may be transferred to the Trap Software 6 and reinserted into the Modified Software 7 where they can be executed locally on the Software User's 2 computer at full speed. The number of instruction sequences 298 that are transferred from the License Server 4 to the Software User 2 for local execution directly affects the security of the method of software protection of the instant invention. The larger the number of instruction sequences 298 transferred from the License Server 4 to the Software User 2 for local execution, the more security is sacrificed. An instruction sequence 298 that is transferred to any Software User 4, must be considered to have been transferred to all Software Users 4 to protect against the possibility of an orchestrated attempt to reverse engineer the software being protected by the method of the instant invention. The License Server's 4 software object 72 has communicated 17 to it a request from the Trap Software 6 to execute an instruction sequence 298. Software object 72 communicates 42 this request (including the instruction sequence 298, as previously discussed) to software object 281 which then acts to execute the communicated 42 instruction sequence 298 emulating operation of the Original Software 9. The results of the emulation are communicated 283 by software object 281 to software object 284 which determines whether the results of the remote execution on the License Server 4 caused the movement of more than 8 k bytes of read/writes across the network. 8 k bytes is chosen arbitrarily and other numbers may suffice. If software object 284 determines that more than 8 k bytes of read/writes occurred, then it communicates 285 this fact to software object 289, otherwise the fact that more than 8 k of reads/writes did not occur is communicated 286 by software object 284 to software object 287. Software object 289 determines whether more than 50% of the instructions removed (by the Software Profiler 10) from the Original Software 9 have already been communicated 114 to any of the Software Users 2, by any License Server 4. In the preferred embodiment all instruction sequences 298 that have ever been released by any License Server 4 to any Software User 2 must never total more than 50%. The percentage selected, 50%, can be changed by the Software Vendor 3 to reflect the level of security desired. If software object 289 determines that 50% of the removed instructions have already been communicated 114 to Software Users 4, then software object 289 communicates 294 this fact to software object 45 which acts to send the results of the execution of instruction sequence 298 to the Trap Software 6 as it would under normal circumstances. If software object 289 determines that 50% of the instruction sequences 298 have not yet been communicated to Software Users 4, then software object 289 communicates 290 a "no" to software object 291 which acts to communicate 114 the currently executing instruction sequence 298 (which has been determined as a poor choice for remote execution) to the Trap Software 6 where it can be reinserted into Modified Software 7 and allowed to execute locally. Software object 291 communicates 32 to software object 72 information that software object 291 has received the instruction sequence 298 which causes software object 72 to continue to process further request from the client (Trap Software 6). If software object 284 determines that less than 8 k bytes of network read/writes occurred then this fact is communicated 286 to software object 287. Software object 287 determines if the instruction sequence 298 has executed more than 100 times in the last minute. The number 100 is chosen arbitrarily and other values, such as 80 and 300, will suffice. If software object 287 determines that the instruction sequence 298 has been executed more than 100 times in the last minute, it communicates 288 this fact to software object 289, otherwise software object 287 communicates 293 the information that the instruction sequence 298 has not executed more than 100 times in the last minute to software object 45. Software object 45 communicates 295 to software object 72 that software object 45 has finished communicating 17 the results of the remote execution of selected instruction sequences 298 on the License Server 4 to the Trap Software 6, causing software object 72 to continue to process further requests from the Trap Software 6.

Figure 16:
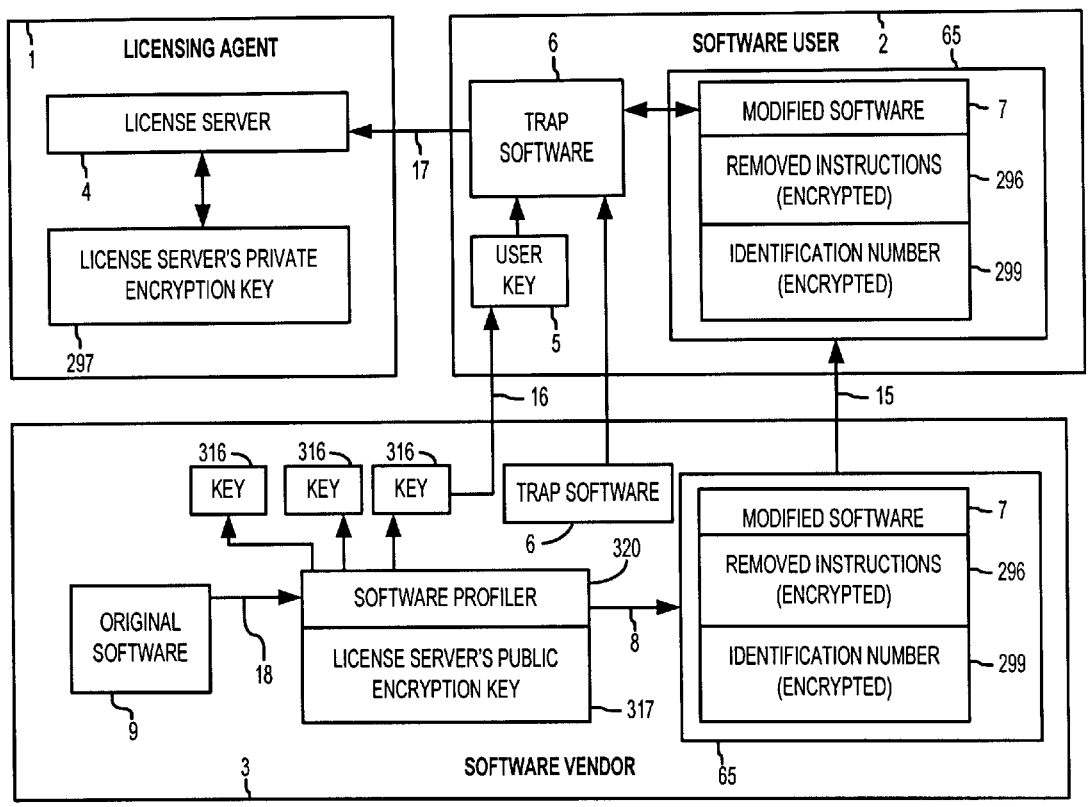
FIG. 16 depicts a block diagrammatic overview of the communication between the License Server, the Software User, and the Software Vendor where the removed instructions are stored locally in an encrypted form on the Software User's computer during practice of the method of the second embodiment of the instant invention.
Figure 18:
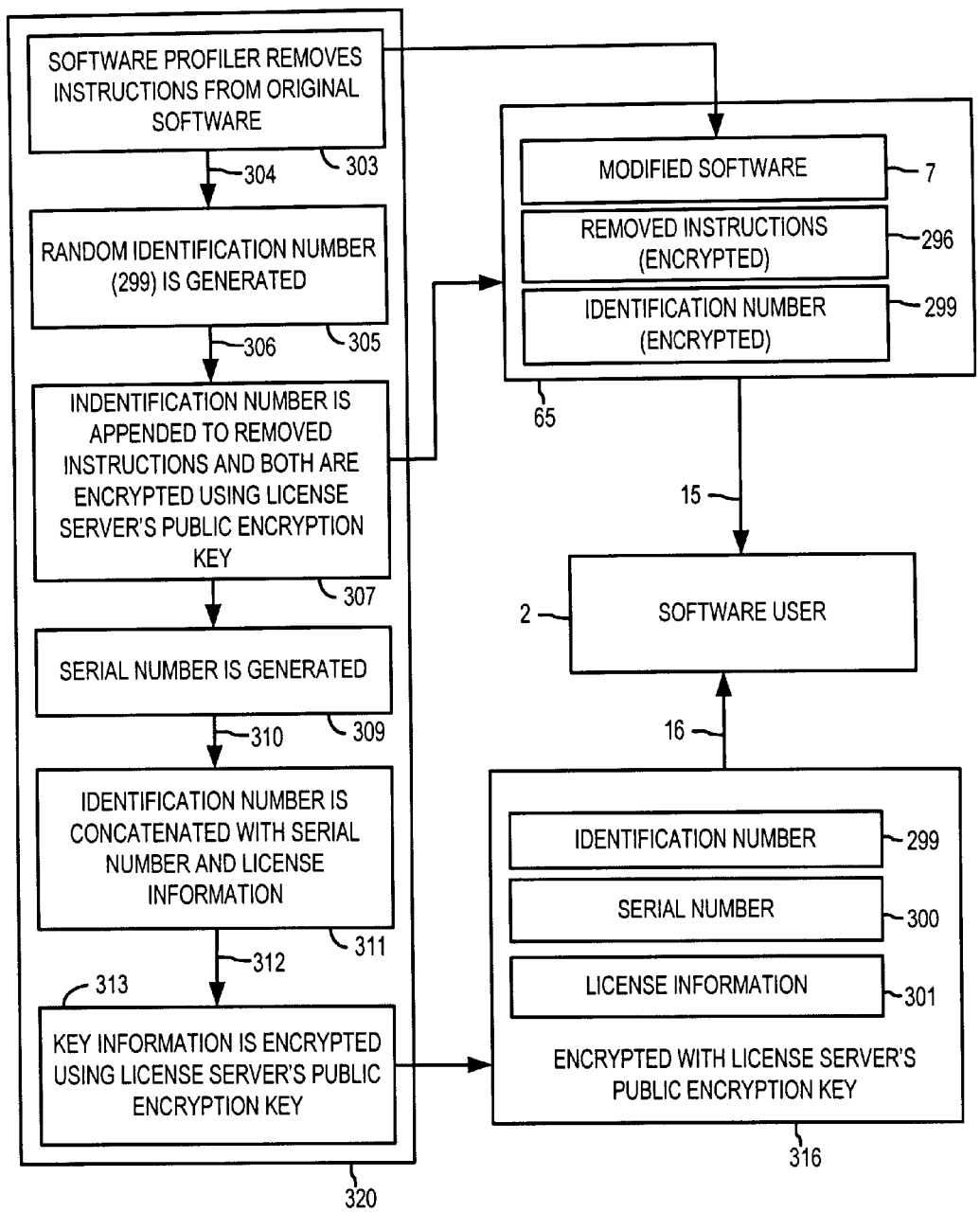
FIG. 18 depicts a block diagrammatic overview of operation of the Software Profiler while producing Modified Software and Keys, without communication between the Software Profiler and the License Server and using encryption during practice of the method of the second embodiment of the instant invention.

A second embodiment of the instant invention is depicted in FIGS. 16 and 18. Such second embodiment provides that the Software Vendor 3 need not communicate with the License Server 4 to create Modified Software 7 nor to create new Keys 316.

FIG. 16 depicts a block diagrammatic overview of the communication between the License Server 4, the Software User 2, and the Software Vendor 3 during practice of the method of the second embodiment of the instant invention wherein selected instruction sequences 298 are stored locally on the Software User's 2 computer in an encrypted form and Keys 316 are generated by the Software Vendor 3. The method of the second embodiment as depicted in FIG. 16 should be compared to the method of the first embodiment as depicted in FIG. 1. Similarly to the first embodiment, as previously discussed in the detailed description of FIG. 1, in the second embodiment (see FIG. 16) the Original Software 9 is communicated 18 to the Software Profiler 320 which acts to remove instruction sequences 298 from the Original Software 9 and outputs 8 a Modified Software 7. Unlike the first embodiment (FIG. 1) in the second embodiment the instruction sequences 298 removed by the Software Profiler 320 are not communicated to the License Server 4. Instead, the removed instruction sequences 298 are appended to a random identification number 299 and encrypted using an asymmetrical (public/private key) encryption algorithm. In the second embodiment, the License Server's 4 Public Key 317 is used for the encryption process and can be stored in the Software Profiler 320. Furthermore, Keys 316 can be created by the Software Profiler 320 without need for communication with the License Server 4 as depicted by FIG. 18. Thus, in the practice of the second embodiment of the instant invention, the Software Vendor 3 need not communicate at all with the Licensing Agent 1 or License Server 4 except for accounting purposes. After the Software Vendor 3 has created Modified Software 7, Encrypted Instructions 296, Identification Number 299, and Keys 316, they can be communicated to the Software User 2. The Modified Software 7, Encrypted Instructions 296, and Identification Number 299, are grouped together, appended to form software object 65, and communicated 314 to the Software User 2. The User Key 5, a single Key 316, is communicated 16 to the Software User 2 from the Software Vendor 3, potentially but not necessarily a different communication path than that of communication 314. Software User 2 then runs Trap Software 6 which obtains the User Key 5 and communicates 17 the User Key 5, together with Instructions 296 and Identification Number 299 (Instructions 296 and Identification Number 299 are encrypted with License Server's 4 Public Encryption Key 317) to License Server 4. License Server 4 uses its Private Encryption Key 297 to decrypt the Instructions 296, Identification Number 299, and the User Key 316. After decryption, the License Server 4, compares the Identification Number 299 with the identification number stored in the decrypted User Key 5. If the two identification numbers do not match, the User Key 5 is invalid. If the User Key 5 is valid, the License Server 4 uses the serial number as decrypted from User Key 5 to check to make sure no other Software User 2 is using the same User Key 5. In this manner, the License Server 4 does not know how many Keys 11 have been created by the Software Vendor 3 nor does it need to keep track of the removed instruction sequences 298 for different software packages. A third party cannot discover the identification number because it is stored in an encrypted form. Because no third party can discover the identification number, no third party can forge or reverse engineer their own User Key 5. After the License Server 4 has verified that the User Key 5 is valid and not in use by another Software User 2, the License Server 4 allows Trap Software 6 to execute missing instruction sequences 298 as discussed previously. This method of the second embodiment of the instant invention has the advantage that License Servers 4 do not keep a list of existing nor removed instruction sequences 298 for the various Modified Softwares 7 being run or executed by the various Software Users 4. This method of the second embodiment of the instant invention has the disadvantage that the instruction sequences 298 are locally available to persons who might try to reverse engineer the protections of the instant invention through decryption of software object 65 and the safety (security) of the instruction sequences 298 to be executed on the License Server 4 depends on the strength of the encryption algorithm. This method also has the disadvantage that the encrypted instruction sequences 298 must be transmitted by the Trap Software 6 before they can be decrypted and executed resulting in slower start up times of the Modified Software 7.

FIG. 17 depicts a block diagrammatic overview of a Key 316 during practice of the second embodiment of the practice of the method of the second embodiment of the instant invention. The second embodiment Key 316 can be generated by the Software Vendor 3 without communication with the License Server 4 as shown in FIG. 16. Because the License Server 4 has no knowledge of the Key 316, the License Server 4 must be able to verify that the Key 316 was generated by the Software Vendor 3 and not some other person. Also, because the License Server 4 has no knowledge of the Key 316, the Key 316 must contain all of the license information 301 which was discussed in the detailed description of FIG. 5. The second embodiment Key 316 contains an identification number 299. The identification number 299 is also stored along with the encrypted instructions as described in the detailed description of FIG. 16. Because the entire Key 316 (including the identification number 299) is encrypted with the License Server's 4 Private Encryption key 317; and the encrypted instructions with the appended identification number 299 are also encrypted with the License Server's 4 Public Encryption Key 317, the only entity capable of decrypting the two is the License Server 4. Thus, only a License Server 4 is capable of verifying that a User Key 5 is valid by comparing the identification number 299 included as part of the User Key 5 (FIG. 17) with the identification number 299 appended to the modified software 7 (FIG. 16). The Software Vendor 3, who generated the identification number 299, is capable of creating new Keys 316. Keys 316, in the second embodiment, also contain a serial number 300. The serial number 300 is used to distinguish between various Keys 316 by the License Server 4. The Software Vendor 3 can generate as many Keys 316 as is desired by using different serial numbers 300. If the License Server 4 is to bill the Software Vendor 3 for the use of each Key 316, this can happen the first time the License Server 4 sees a new serial number 300 being used. The License Server 4 has no knowledge of which serial numbers 300 were generated by the Software Vendor 3 before the serial numbers 300 are used by Software User 2. If the Key 316 is lacking license information 301 License Server 4 will only honor one User Key 5 with the same serial number 300 at a time. However, if the User Key 5 also contains license information 301, then it may be a group license key as discussed in the detailed description of FIG. 5.

FIG. 18 depicts in detail the Software Profiler's 320 production of Modified Software 7 and Keys 316 without communicating with the License Server 4 using encryption during the practice of the method of the second embodiment of the instant invention. Software Object 303 acts to remove instructions from the Original Software 9 in a manner similar to that shown in FIG. 6. At the end of the profiling process the Software Profiler's 320 produces Modified Software 7 as shown in FIG. 6, however instead of communicating the removed instruction sequences 298 to the License Server 4, the removed instruction sequences 298 are communicated 304 to software object 305. Software object 305 acts to generate a random identification number 299. The identification number 299 is a secret to the Software Vendor 3 and is used by the License Server 4 to verify the identity of the Software Vendor 3. The identification number 299 is communicated 306 to software object 307 which acts to append the identification number 299 to the removed instruction sequence 298 and encrypt both the identification number 299 and the removed instruction sequence 298 using the License Server's 4 Public Encryption Key 317. Software object 307 communicates completion of the encryption to software object 309 which then acts to generate a serial number 300. A serial number 300 is simply any unique numerical value, one value per Key 316 to be generated. Software object 309 acts to communicate 310 the generated serial number 300 to software object 311. Software object 311 acts to concatenate the identification number 299, the serial number 300, and the license information 301. After software object 311 concatenates the identification number 299, the serial number 300, and license information 301 into a single information packet, it communicates 312 this information packet to software object 313. Software object 313 acts to encrypt the information packet using the Public Encryption Key 317 of the License Server 4. The License Server's 4 Public Encryption Key 317 can be stored within the Software Profiler 320. The encrypted information packet now becomes a Key 316. The resulting Key 316 can be communicated 16 to the Software User 2. As well, Removed Instructions 296 combined with the Identification Number 299 (which are encrypted), and Modified Software 7 can be communicated 314, to the Software User 2 for immediate use.

The third embodiment of the instant invention is identical to the second embodiment of the instant invention with the sole exception that the License Server 4 is a secure server software object residing on the Software User's 2 computer. The operation and functions of the software objects described in detail for the second embodiment of the instant invention are identical for the third embodiment of the instant invention, the only difference being the length of the communication 17 line. An example of a third embodiment might include a microprocessor within a tamper resistant casing, residing inside or connected locally to the Software User's 2 computer. This microprocessor can execute at much slower speeds than the Software User's 2 main processor because it executes instructions infrequently, allowing for lower cost and higher overall execution speed than prior art encrypting microprocessors. As well, any microprocessor with sufficient memory can be used because instruction sequences are emulated for another computer architecture. This also reduces the hardware design and manufacturing cost. For example an 8 bit microprocessor can be used to emulate the instructions of a 32 bit microprocessor through the use of multiple 8 bit instructions for each 32 bit instruction.

Benefit to Industry

As can be readily seen from the foregoing description of the preferred embodiment, the essence of the invention is the distributed execution of an executable file with the execution of a chosen portion of the executable talking place on a License Server 4. The License Server 4, and its contents, are maintained in a state of high security, both physically and electronically. The security afforded to the License Server 4 and its contents becomes the security afforded to the Original Software 9, as only the Modified Software 7 is distributed publicly to Software Users 2.

In this time of rapidly increasing accessibility to high bandwidth network connections, the applicability of the instant invention is expected to be close to universal. All Software Vendors 3 whose customer base is internet connected may benefit from the copy protection afforded by the instant invention. Further, due to the reduced copying of software and presumed continued widespread use for and of such software, it may reasonably be expected that Software Vendors 3 will be able to obtain a reasonable return on their software development investment while selling the software to the public at a lower price.

I claim:

1. A method of preventing unauthorized use of an executable file comprising selecting from said executable file sequences of instructions, creating a modified executable file by replacing each of said selected sequences of instructions with instructions that interrupt the normal flow of execution, installing said modified executable file in a first computer, installing said selected sequences of instructions in a license server, executing said modified executable file in said first computer until one of said instructions that interrupt the normal flow of execution is encountered, communicating said first computer's machine state to said license server, determining in said license server whether said first computer is authorized, executing one of said selected sequences of instructions in said license server if said first computer is authorized, communicating the results of said license server's execution of said one of said selected sequences of instructions to said first computer, and continuing execution of said modified executable file in said first computer until another of said instructions that interrupt the normal flow of execution is encountered or until execution of said modified executable file is complete;

wherein said machine state comprises the contents of the CPU registers and the program counter value, and wherein said license server emulates operation of said first computer when said license server executes said one of said selected sequences of instructions in said license server.

2. A system which protects an executable file from unauthorized use comprising a license server, a user's computer, a vendor's computer, a first software object, a second software object, and a third software object;

wherein said first software object executes on said vendor's computer, selects from said executable file sequences of instructions, creates a modified executable file by replacing said selected sequences of instructions with instructions that interrupt the normal flow of execution, communicates said selected sequences of instructions to said license server, and communicates said modified executable file to said user's computer;

wherein said second software object executes on said user's computer, executes said modified executable file until one of said instructions that interrupt the normal flow of execution is encountered, communicates said first computer's machine state to said license server, receives the results of said license server's execution of said selected sequences of instructions, and utilizes said results to continue execution of said modified executable file until another of said instructions that interrupt the normal flow of execution is encountered or until execution of said modified executable file is complete;

wherein said third software object executes on said license server, determines whether said user's computer is authorized, receives said machine state from said user's computer, utilizes said user's computer's machine state to initialize execution of each of said selected sequences of instructions at the address of said user's computer at the time that said instructions that interrupt the normal flow of execution were encountered if and only if said user's computer is authorized, and communicates said results of execution of said selected sequences of instructions to said user's computer;

wherein said machine state comprises the contents of the CPU registers and the program counter value; and wherein said license server emulates operation of said first computer when said license server executes said one of said selected sequences of instructions in said license server.

3. The system of claim 1 wherein said instructions that interrupt the normal flow of execution comprise breakpoint instructions.

4. The method of claim 1 wherein said machine state additionally comprises selected portions of the RAM contents.

5. The method of claim 1 wherein each of said selected sequences of instructions receives a different input or produces a different output when said executable file is executed multiple times.

6. The method of claim 1 wherein a plurality of said license servers are connected to a network and any one of said plurality of said license servers can be selected by said second computer whereby said network latency time and said license server processor load can be optimized.

7. The method of claim 1 wherein said selected sequences of instructions are encrypted and stored on said user's computer until time of execution of said executable file.

8. The method of claim 1 wherein said selected sequences of instructions are encrypted using public/private key cryptography and said license server's private key is used to decrypt said sequences of instructions.

9. The method of claim 1 wherein said license server resides in a physically secure microprocessor attached to or enclosed within said first computer.

10. The system of claim 2 wherein said instructions that interrupt the normal flow of execution comprise breakpoint instructions.

11. The system of claim 2 wherein said machine state additionally comprises selected portions of the RAM contents.

12. The system of claim 2 wherein each of said selected sequences of instructions receives a different input or produces a different output when said executable file is executed multiple times.

13. The system of claim 2 wherein a plurality of said license servers are connected to a network and any one of said plurality of said license servers can be selected by said second computer whereby said network latency time and said license server processor load can be optimized.

14. The system of claim 2 wherein said selected sequences of instructions are encrypted and stored on said user's computer until time of execution of said executable file.

15. The system of claim 2 wherein said selected sequences of instructions are encrypted using public/private key cryptography and said license server's private key is used to decrypt said sequences of instructions.

16. The system of claim 2 wherein said license server resides in a physically secure microprocessor attached to or enclosed within said first computer.

* * * * *